United States Patent
Chandak et al.

(10) Patent No.: US 12,503,534 B2
(45) Date of Patent: *Dec. 23, 2025

(54) BIMODAL LINEAR LOW DENSITY POLYETHYLENE COPOLYMER

(71) Applicant: Dow Global Technologies LLC, Midland, MI (US)

(72) Inventors: Swapnil B. Chandak, Pearland, TX (US); Nitin K. Borse, Pearland, TX (US); Roger L. Kuhlman, Lake Jackson, TX (US); John F. Szul, Hurricane, WV (US)

(73) Assignee: Dow Global Technologies LLC, Midland, MI (US)

( * ) Notice: Subject to any disclaimer, the term of this patent is extended or adjusted under 35 U.S.C. 154(b) by 444 days.

This patent is subject to a terminal disclaimer.

(21) Appl. No.: 17/915,575

(22) PCT Filed: Mar. 30, 2021

(86) PCT No.: PCT/US2021/024824
§ 371 (c)(1),
(2) Date: Sep. 29, 2022

(87) PCT Pub. No.: WO2021/202483
PCT Pub. Date: Oct. 7, 2021

(65) Prior Publication Data
US 2023/0127331 A1    Apr. 27, 2023

Related U.S. Application Data

(60) Provisional application No. 63/031,776, filed on May 29, 2020, provisional application No. 63/031,801, filed on May 29, 2020, provisional application No. 63/003,288, filed on Apr. 1, 2020.

(51) Int. Cl.
*C08F 210/02* (2006.01)
*C08J 5/18* (2006.01)

(52) U.S. Cl.
CPC ............ *C08F 210/02* (2013.01); *C08J 5/18* (2013.01); *C08F 2420/04* (2013.01); *C08F 2500/08* (2013.01); *C08J 2323/06* (2013.01)

(58) Field of Classification Search
CPC ...................... C08F 210/10–210/20
See application file for complete search history.

(56) References Cited

U.S. PATENT DOCUMENTS

| | | |
|---|---|---|
| 7,129,302 B2 | 10/2006 | Mink et al. |
| 7,576,166 B2 | 8/2009 | Aarila et al. |
| 7,897,710 B2 | 3/2011 | Amos et al. |
| 8,008,403 B2 | 8/2011 | Kipke et al. |
| 8,637,421 B2 | 1/2014 | Razavi |
| 8,846,188 B2 | 9/2014 | Fantinel et al. |
| 8,957,158 B2 | 2/2015 | Fantinel et al. |
| 9,079,993 B1 | 7/2015 | St Jean et al. |
| 9,090,762 B2 | 7/2015 | Kipke et al. |
| 9,284,389 B2 | 3/2016 | St et al. |
| 9,309,338 B2 | 4/2016 | St Jean et al. |
| 9,605,097 B2 | 3/2017 | Sukhadia et al. |
| 10,941,284 B2 | 3/2021 | Chandak et al. |
| 11,149,136 B2 | 10/2021 | Borse et al. |
| 2006/0036041 A1 | 2/2006 | Kwalk |
| 2015/0133615 A1 | 5/2015 | Mariott et al. |
| 2019/0256629 A1 | 8/2019 | Chandak et al. |
| 2020/0048383 A1 | 2/2020 | Hule et al. |
| 2020/0279671 A1 | 9/2020 | Doufas et al. |
| 2021/0147591 A1 | 5/2021 | Borse et al. |
| 2021/0380737 A1 | 12/2021 | Mure et al. |

FOREIGN PATENT DOCUMENTS

| | | | |
|---|---|---|---|
| CN | 104918972 A | 9/2015 | |
| WO | WO-2010034520 A1 * | 4/2010 | ............. C08F 10/00 |
| WO | WO-2018075243 A1 * | 4/2018 | ............. C08F 210/16 |
| WO | WO-2018089193 A1 * | 5/2018 | ............. C08F 10/02 |

OTHER PUBLICATIONS

International Preliminary Report on Patentability for related PCT Application No. PCT/US2021/024824, mailed Oct. 13, 2022 (7 pgs).
International Search Report & Written Opinion for related PCT Application No. PCT/US2021/024824, mailed Sep. 1, 2021 (12 pgs).

\* cited by examiner

*Primary Examiner* — Prashant J Khatri

(57) ABSTRACT

Provided are bimodal linear low density polyethylene copolymers (B-LLDPE copolymers) that have a combination of improved properties comprising at least one processability characteristic similar or better than that of an unblended monomodal ZN-LLDPE and a dart impact property similar or better than that of an unblended monomodal MCN-LLDPE. For the various aspects, the B-LLDPE copolymer has a density from 0.8900 to 0.9300 g/cm$^3$; a melt index ($I_2$) from 0.1 g/10 min. to 5 g/10 min.; a $M_z$ from 600,000 to 1,900,000 g/mol; and a SHI from 5.35 to 75 $\eta^*(1.0)/\eta^*(100)$. The B-LLDPE copolymer can be further characterized by a first melt flow ratio ($I_{21}/I_2$) from 32 to 140 and a first molecular weight ratio ($M_z/M_w$) from 4.5 to 11.

15 Claims, 3 Drawing Sheets

BIMODAL LINEAR LOW DENSITY POLYETHYLENE COPOLYMER

Figure 1:
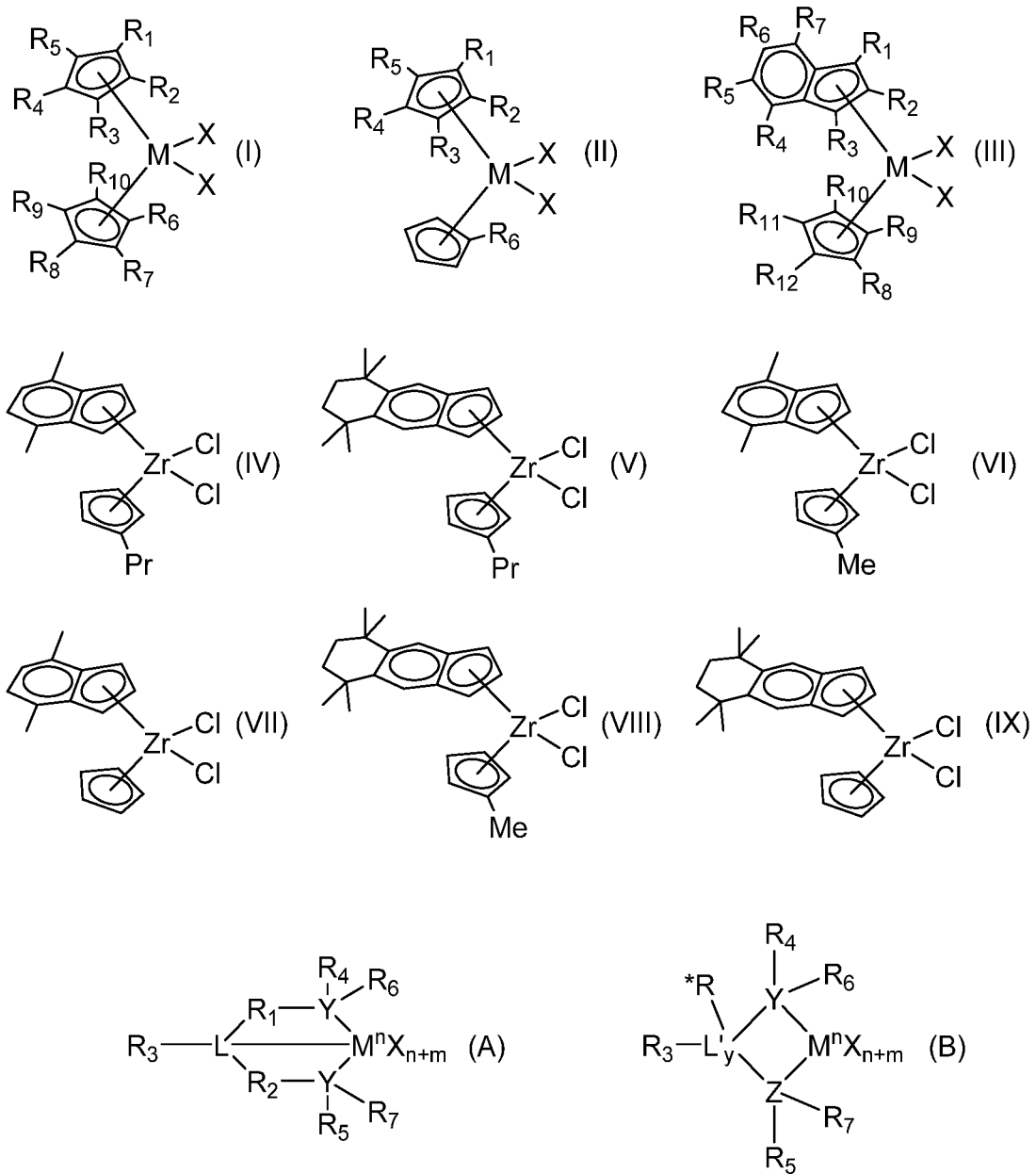

This application is a National Stage Application under 35 U.S.C. § 371 of International Application Number PCT/US2021/024824, filed Mar. 30, 2021 and published as WO 2021/202483 A1 on Oct. 7, 2021, which claims the benefit to U.S. Provisional Application's 63/031,801, filed May 29, 2020, 63/031,776, filed May 29, 2020 and 63/003,288, filed Apr. 1, 2020, the entire contents of which are all incorporated herein by reference in its entirety

FIELD OF DISCLOSURE

Embodiments of the present disclosure are directed towards polyethylene copolymers, more specifically, to bimodal linear low density polyethylene copolymers.

BACKGROUND

Linear low density polyethylene ("LLDPE") is compositionally distinct from low density polyethylene ("LDPE") and has certain superior properties that have led it to replace LDPE in many commercial applications. These include films, sheets, and injection molded articles. LLDPE films and sheets are used in packaging applications and non-packaging applications. Examples are agricultural film, food packaging, garment bags, grocery bags, heavy-duty sacks, industrial sheeting, pallet and shrink wraps and bags. LLDPE injection molded articles include buckets, freezer containers, lids, and toys.

Polyethylenes are mentioned in CA 2427685 A1; U.S. Pat. Nos. 7,576,166 B2; 7,897,710 B2; 8,008,403 B2; 8,846,188 B2; 8,957,158 B2; 9,090,762 B2; 9,284,389 B2; 9,309,338 B2; WO 2006/045738 A1 and WO 2015/069637 A2.

U.S. Pat. No. 7,576,166 B2 to J. Aarlla et al. relates to a process for producing linear low-density polyethylene compositions using Ziegler-Natta catalysts, and including a process for producing bimodal linear low-density polyethylene polymer compositions, useful for making films.

U.S. Pat. Nos. 8,846,188 B2 and 8,957,158 B2, both to F. Fantinel et al., relate to impact resistant LLDPE composition and films made thereof. The polyethylene is produced in one gas phase reactor.

WO 2015/069637 A2 to A. M. Sukhadia relates to low density polyolefin resins with low molecular weight and high molecular weight components, and films made therefrom. Ethylene-based polymers produced using dual metallocene catalyst systems.

One improvement for each of the LLDPE provided above and generally in the art is to produce a LLDPE that is not only easy to process, as measured in terms of extruder barrel pressure and rheology testing such as shear thinning (among others) but also has improved mechanical strength and toughness as shown by improvements in melt strength, low tan delta values and a broad z-average molecular weight over weight average molecular weight ($M_z/M_w$) value range, among other properties.

SUMMARY

The present disclosure provides for bimodal linear low density polyethylene copolymers (B-LLDPE copolymer) that address many of the problems associated with the manufacture, use, and performance of prior LLDPEs made with metallocene catalyst ("prior MCN-LLDPE"). The B-LLDPE copolymer of the present disclosure further addresses the need in the manufacture, use, and performance of resin blends that include LLDPEs made with Ziegler-Natta catalyst and the prior MCN-LLDPE. For example, relative to processability of prior LLDPEs made with Ziegler-Natta catalyst ("prior ZN-LLDPE"), prior MCN-LLDPEs have inferior processability. For example, during extrusion of the prior MCN-LLDPE, the extruder barrel pressure is higher than during extrusion of prior ZN-LLDPE. Also, prior MCN-LLDPEs may have insufficient sealability (e.g., hot seal/hot tack may be too weak) relative to prior ZN-LLDPE. Other processability drawbacks of prior MCN-LLDPEs may include tan delta values that are too high, narrow z-average molecular weight over weight average molecular weight (Mz/Mw) value range, molecular weight distributions (MWD), e.g., $M_w/M_n$, measured by GPC, that are too narrow, and shear thinning index values that are too low.

The B-LLDPE copolymers of the present disclosure provide a technical solution to the above problems, where the B-LLDPE copolymer has at least one processability characteristic similar to that of an unblended monomodal ZN-LLDPE and at least one stiffness/mechanical property similar to that of an unblended monomodal MCN-LLDPE. The B-LLDPE copolymer is made with a bimodal catalyst system, where products made therefrom, methods of making and using same, and articles containing same are provided herein. The B-LLDPE copolymer has a combination of improved properties comprising at least one processability characteristic similar to that of an unblended monomodal ZN-LLDPE and a dart impact property similar to that of an unblended monomodal MCN-LLDPE.

In some aspects the B-LLDPE copolymer is characterized by a density from 0.8900 to 0.9300 gram per cubic centimeter (g/cm$^3$) measured according to ASTM D792-13, Method B; a melt index ($I_2$) from 0.1 grams per 10 minutes (g/10 min.) to 5 g/10 min., measured according to the Melt Index Test Method at 190° C. and 2.16 kilograms according to ASTM D1238-13; a $M_z$ from 600,000 to 1,900,000 grams per mole (g/mol), measured according to the Gel Permeation Chromatography (GPC) Test Method; and a shear thinning index (SHI) from 5.35 to 75 η*(1.0)/η*(100) measured according to SHI Test Method. The B-LLDPE copolymer is further characterized by having a first melt flow ratio ($I_{21}/I_2$) from 32 to 140, measured according to the Melt Index Test Method at 190° C. and 21.6 and 2.16 kilograms, respectively, according to ASTM D1238-13; and having a first molecular weight ratio ($M_z/M_w$) from 4.5 to 11, measured according to the GPC Test Method, wherein $M_z$ is z-average molecular weight and $M_w$ is weight-average molecular weight.

In an additional aspect, the B-LLDPE copolymer is further characterized in that the $I_2$ is from 0.80 g/10 min. to 1.2 g/10 min., measured according to the Melt Index Test Method at 190° C. and 2.16 kilograms according to ASTM D1238-13; and the $M_z$ is from 630,000 to less than 1,700,000 g/mol, measured according to the GPC Test Method. For this additional aspect, the density of the B-LLDPE copolymer is from 0.916 to 0.926 g/cm$^3$ measured according to ASTM D792-13, Method B; and the B-LLDPE copolymer has a tan delta (tan δ) from 2 to 6, measured at 190° C. and a frequency of 0.1000 radians per second (rad/s) according to Tan Delta (Tan δ) Test Method. This additional aspect can further include a tan δ from 5.6 to 6, measured at 190° C. and a frequency of 0.1000 radians per second (rad/s) according to Tan Delta Test Method, a density from 0.916 to 0.918 g/cm$^3$ measured according to ASTM D792-13, Method, and the $M_z/M_w$ is 5 to 5.6, measured according to the GPC Test Method.

In another aspect, the B-LLDPE copolymer has a density from 0.915 to 0.920 g/cm$^3$ measured according to ASTM D792-13, Method B; an I2 from 3.2 g/10 min. to 3.6 g/10 min., measured according to the Melt Index Test Method at 190° C. and 2.16 kilograms according to ASTM D1238-13; an $M_z$ from 800,000 to 1,200,000 g/mol, measured according to the GPC Test Method; and a SHI from 10 to 12 $\eta^*(1.0)/\eta^*(100)$ measured according to SHI Test Method. For this given B-LLDPE copolymer, the tan δ is from 3 to 4, measured at 190° C. and a frequency of 0.1000 radians per second (rad/s) according to tan δ Test Method.

In a further aspect, the B-LLDPE copolymer has a density from 0.9160 to 0.9200 g/cm$^3$ measured according to ASTM D792-13, Method B; an I2 from 0.1 g/10 min. to 0.8 g/10 min., measured according to the Melt Index Test Method at 190° C. and 2.16 kilograms according to ASTM D1238-13; an $M_z$ is from 650,000 to 1,900,000 g/mol, measured according to the GPC Test Method; and a SHI from 6 to 32 $\eta^*(1.0)/\eta^*(100)$ measured according to SHI Test Method. For this given B-LLDPE copolymer, the tan δ is from 1.6 to 3.1, measured at 190° C. and a frequency of 0.1000 radians per second (rad/s) according to tan δ Test Method. This additional aspect can further include a $I_2$ from 0.3 g/10 min. to 0.4 g/10 min., measured according to the Melt Index Test Method at 190° C. and 2.16 kilograms according to ASTM D1238-13.

In a further aspect, each of the B-LLDPE copolymers provided above has a number of short chain branches per 1000 carbon atoms, measured according to the GCP Test Method, that is greater at Mw than at Mn.

Aspects of the present disclosure include a manufactured article comprising a shaped form of the B-LLDPE copolymers provided above.

Aspects of the present disclosure also include a method of making the B-LLDPE copolymer as provided above, where the method comprises contacting ethylene ("$C_2$") and a comonomer ("$C_x$") selected from 1-butene ($C_x=C_4$), 1-hexene ($C_x=C_6$), or both ($C_x=C_4$ and $C_6$) at a comonomer-to-ethylene ($C_x/C_2$) molar ratio of 0.005 to 0.30 with a bimodal catalyst system comprising bis[(2-pentamethylphenylamido)ethyl]amine zirconium dibenzyl in the presence of molecular hydrogen gas ($H_2$) at a hydrogen-to-ethylene ($H_2/C_2$) molar ratio from 0.001 to less than 0.012, all in a single gas phase polymerization reactor containing a fluidized resin bed at a temperature from 70° C. to 90° C., thereby making the bimodal linear low density polyethylene copolymer. For the various aspects, the method can use a $H_2/C_2$ molar ratio from 0.001 to 0.003. The bimodal catalyst system can further comprise a metallocene other than (tetramethylcyclopentadienyl)(n-propylcyclopentadienyl)zirconium-$X_2$ (X=chloride, methyl).

DRAWINGS

FIG. 1 contains drawings of formulae of (pro)catalysts.

Figure 2:
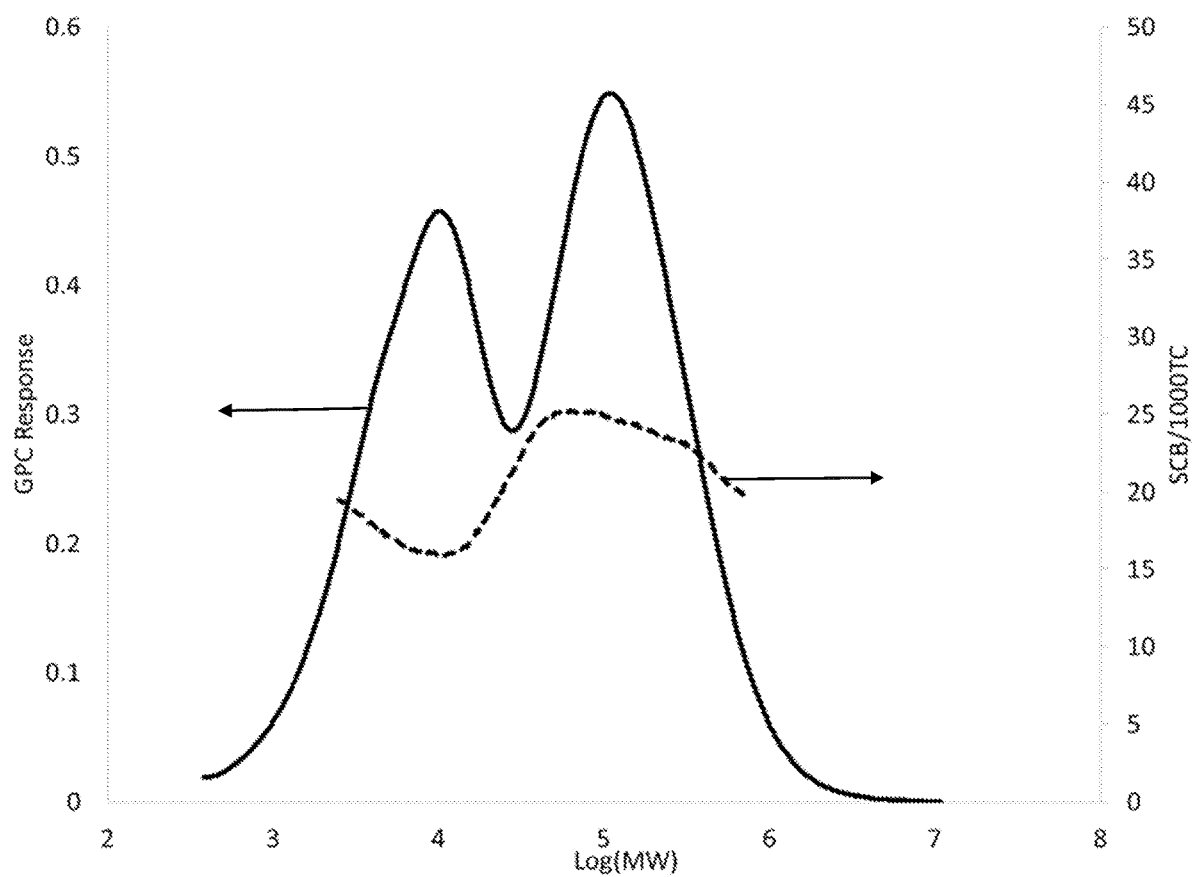

FIG. 2 presents a plot of the molecular weight distribution and the short chain branching distribution of the polymer of sample IE 1.

Figure 3:
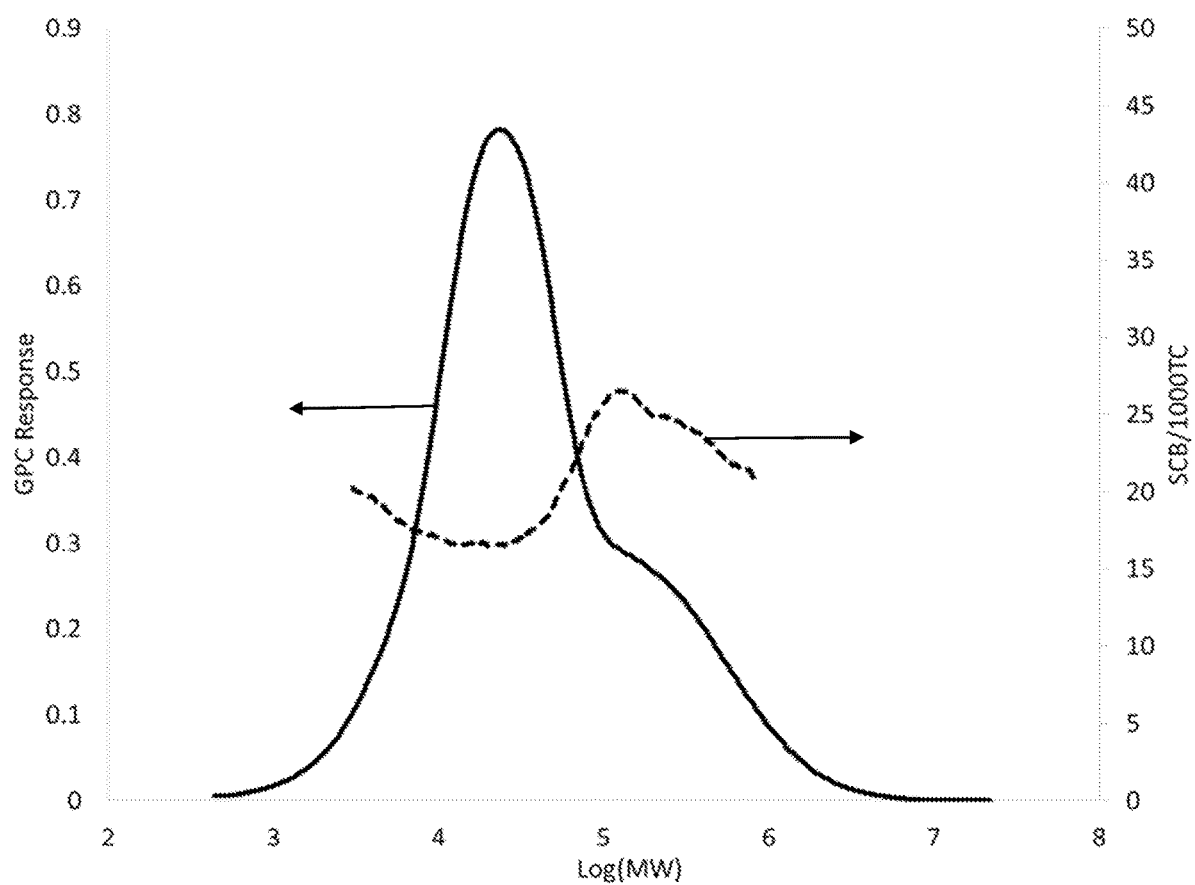

FIG. 3 presents a plot of the molecular weight distribution and the short chain branching distribution of the polymer of sample IE 5.

DETAILED DESCRIPTION

The Summary and Abstract are incorporated here by reference.

The bimodal linear low density polyethylene copolymer (B-LLDPE copolymer) of the present disclosure has at least one improved property such as, for example, at least one improved (increased) processability property and/or at least one improved (increased) stiffness property. The improved processability property may be at least one of decreased extruder barrel pressure, increased sealability (e.g., hot seal/hot tack), decreased tan delta value, and increased shear thinning index value. The improved stiffness property may be at least one of increased Elmendorf tear (CD Tear and/or MD Tear), increased melt strength, increased secant modulus, and increased dart impact strength. In some aspects the B-LLDPE copolymer is not characterized by a worsening of any three, alternatively any two, alternatively any one of the foregoing properties. The B-LLDPE copolymer may be used to make films, sheets and injection molded articles.

Certain inventive embodiments are described below as numbered aspects for easy cross-referencing. Additional embodiments are described elsewhere herein.

Aspect 1. A B-LLDPE copolymer comprising a density from 0.8900 to 0.9300 gram per cubic centimeter (g/cm$^3$) measured according to ASTM D792-13, alternatively from 0.8900 to 0.9295 g/cm$^3$, alternatively from 0.9000 to 0.9272 g/cm$^3$, alternatively from 0.9030 to 0.9266 g/cm$^3$, alternatively from 0.9030 to 0.9255 g/cm$^3$, alternatively from 0.9110 to 0.9255 g/cm$^3$, Method B; a melt index ($I_2$) from 0.1 grams per 10 minutes (g/10 min.) to 5 g/10 min., alternatively from 0.1 to 3.5 g/10 min., alternatively from 0.1 to 1.5 g/10 min., alternatively from 0.1 to 0.8 g/10 min. alternatively from 0.1 to 0.5 g/10 min., alternatively from 0.1 to 0.4 g/10 min., alternatively from 0.8 to 5.0 g/10 min., alternatively from 3.0 to 5.0 g/10 min., alternatively from 3.4 to 5.0 g/10 min., measured according to the Melt Index (MI) Test Method at 190° C. and 2.16 kilograms according to ASTM D1238-13; a $M_z$ from 600,000 to 1,900,000 grams per mole (g/mol), alternatively from 600,000 to 1,720,000 g/mol, alternatively from 600,000 to 1,700,000 g/mol, alternatively from 600,000 to 1,650,000 g/mol, alternatively from 600,000 to 1,600,000 g/mol, alternatively from 630,000 to 1,600,000 g/mol, alternatively from 680,000 to 1,600,000 g/mol, measured according to the Gel Permeation Chromatography (GPC) Test Method, described later; and a shear thinning index (SHI) from 5.35 to 75 $\eta^*(1.0)/\eta^*(100)$, alternatively from 5.35 to 70 $\eta^*(1.0)/\eta^*(100)$, alternatively from 5.35 to 60 $\eta^*(1.0)/\eta^*(100)$, alternatively from 5.35 to 50 $\eta^*(1.0)/\eta^*(100)$, alternatively from 5.35 to 40 $\eta^*(1.0)/\eta^*(100)$, alternatively from 5.35 to 38 $\eta^*(1.0)/\eta^*(100)$, alternatively from 5.35 to 36 $q^*(1.0)/\eta^*(100)$, alternatively from 5.35 to 34 $\eta^*(1.0)/\eta^*(100)$, measured according to SHI Test Method, described later. Aspect 2—the B-LLDPE copolymer of aspect 1 further described by a first melt flow ratio ($I_{21}/I_2$) from 32 to 140, alternatively from 32 to 100, alternatively from 32 to 85, alternatively from 32 to 75, alternatively from 35 to 75, measured according to the MI Test Method at 190° C. and 21.6 and 2.16 kilograms, respectively, according to ASTM D1238-13. Aspect 3—the B-LLDPE copolymer of aspect 1 and/or aspect 2 further described by a first molecular weight ratio ($M_z/M_w$) from 4 to 11, alternatively from 4 to 10, alternatively from 4 to 9.5, alternatively 4.1 to 9.5, alternatively 5.0 to 9.0, measured according to the GPC Test Method, wherein $M_z$ is z-average molecular weight and $M_w$ is weight-average molecular weight. Aspect 1, Aspect 2 and/or Aspect 3 can further include a $M_n$ from 7,000 to 32,500 grams per mole (g/mol), alternatively from 7,200 to 30,000 g/mol, alternatively from 7,500 to 27,000 g/mol, alternatively from 7,500 to 23,000 g/mol, alternatively from 7,500 to 20,000 g/mol, alternatively from 7,500 to 16,000 g/mol, alternatively from 7,500 to 15,500 g/mol, measured according to the GPC Test Method, described later; a $M_w$ from 116,000 to 200,000 g/mol, alternatively from 118,000 to 188,000 g/mol, alternatively from 120,000 to 180,000 g/mol, alternatively from 120,000 to 166,000 g/mol, alternatively from 120,000 to 160,000 g/mol, alternatively from 141,000 to 160,000 g/mol, alternatively from 146,000 to 160,000 g/mol, measured according to the Gel Permeation Chromatography (GPC) Test Method, described later; a tan delta (tan δ) from 1.5 to 16.0, alternatively from 1.5 to 9.0, alternatively from 1.5 to 6.0, alternatively from 1.6 to 5.8, alternatively from 1.65 to 4.8, measured at 190° C. and a frequency of 0.1000 radians per second (rad/s) according to Tan Delta (Tan δ) Test Method, described later.

Aspect 4. The B-LLDPE copolymer of aspect 1 further described by 12 being from 0.80 g/10 min. to 1.2 g/10 min., alternatively 0.9 g/10 min. to 1.1 g/10 min., alternatively 0.94 g/10 min. to 1.05 g/10 min., measured according to the MI Test Method at 190° C. and 2.16 kilograms according to ASTM D1238-13; and the $M_z$ being from 630,000 g/mol to less than 1,700,000 g/mol, alternatively from 1,400,000 g/mol to 1,630,000 g/mol, measured according to the GPC Test Method. Aspect 5—the B-LLDPE copolymer of aspect 4 further described by a density from 0.916 to 0.926 g/cm³, alternatively from 0.916 to 0.919 g/cm³, measured according to ASTM D792-13, Method B. Aspect 6—the B-LLDPE copolymer of aspect 4 and/or aspect 5 further described by a tan delta (tan δ) from 2 to 6, measured at 190° C. and a frequency of 0.1000 radians per second (rad/s) according to Tan Delta (Tan δ) Test Method, described later. Aspect 7—the B-LLDPE copolymer of aspect 6 further described by a tan δ from 5.6 to 6, measured at 190° C. and a frequency of 0.1000 rad/s according to Tan Delta Test Method; a density from 0.916 to 0.918 g/cm³ measured according to ASTM D792-13, Method; and an $M_z/M_w$ value of 5 to 5.6, measured according to the GPC Test Method as provided herein. Aspect 8—the B-LLDPE copolymer of any combination of aspect 4, aspect 5, aspect 6 and/or aspect 7 further described by a $I_{21}/I_2$ from 40 to 140, alternatively from 45 to 120, alternatively from 50 to 95, measured according to the Melt Index Test Method at 190° C. and 21.6 and 2.16 kilograms, respectively, according to ASTM D1238-13. Aspect 9—the B-LLDPE copolymer of any combination of aspect 4, aspect 5, aspect 6, aspect 7 and/or aspect 8 further described by a first molecular weight ratio ($M_z/M_w$) from 5 to 11, alternatively from 5.5 to 10.1, alternatively from 4.5 to 8, measured according to the GPC Test Method, wherein $M_z$ is z-average molecular weight and $M_w$ is weight-average molecular weight. Aspect 10—the B-LLDPE copolymer of any combination of aspect 4, aspect 5, aspect 6, aspect 7, aspect 8 and/or aspect 9 further described by a low elution fraction of 1.7 percent to 10 percent as measured by iCCD technique, described later, from above 25° C. to below 35° C. Aspect 11—the B-LLDPE copolymer of any combination of aspect 4, aspect 5, aspect 6, aspect 7, aspect 8, aspect 9 and/or aspect 10 further described by a high density fraction of 0.9 percent to 4.1 percent, alternatively from 0.9 percent to 3.4 percent, as measured by iCCD technique, described below, from above 95° C. to below 115° C. The B-LLDPE copolymer of each of aspects 4-11 can have a molecular mass dispersity ($M_w/M_n$), which may be referred to as molecular weight distribution, from 5.0 to 16.5, alternatively the $M_w/M_n$ of the B-LLDPE copolymer can be from 5.0 to 10.0, all measured according to the GPC Test Method, described later. In addition, the B-LLDPE copolymer of each of aspects 4-11 can have a melt strength (measured at 190° C.) from 2.0 cN to 5.0 cN, alternatively the melt strength is from 2.4 cN to 5.0 cN, measured according to the Melt Strength Test Method, described later.

Aspect 12. The B-LLDPE copolymer of aspect 1, where the density from 0.915 to 0.920 g/cm³ measured according to ASTM D792-13, Method B; the $I_2$ is from 3.2 g/10 min. to 3.6 g/10 min., alternatively the $I_2$ is from 3.4 g/10 min. to 3.6 g/10 min. measured according to the MI Test Method at 190° C. and 2.16 kilograms according to ASTM D1238-13; the $M_z$ is from 800,000 to 1,200,000 g/mol, measured according to the GPC Test Method; and the SHI from 10 to 12 η*(1.0)/η*(100) measured according to SHI Test Method. Aspect 13—the B-LLDPE copolymer of aspect 12 further described by a tan δ from 3 to 4, measured at 190° C. and a frequency of 0.1000 radians per second (rad/s) according to Tan δ Test Method. Aspect 14—the B-LLDPE copolymer of aspect 12 and/or aspect 13 further described by $I_{21}/I_2$ from 90 to 100, measured according to the Melt Index Test Method at 190° C. and 21.6 and 2.16 kilograms, respectively, according to ASTM D1238-13. Aspect 15—the B-LLDPE copolymer of any combination of aspect 12, aspect 13 and/or aspect 14 further described by a first MWR ($M_z/M_w$) from 8 to 9, measured according to the GPC Test Method. The B-LLDPE copolymer of each of aspects 12-15 can have a $M_w/M_n$ from 6.0 to 8.0, alternatively the $M_w/M_n$ of the B-LLDPE copolymer can be from 6.5 to 7.5, all measured according to the GPC Test Method, described later. In addition, the B-LLDPE copolymer of each of aspects 12-15 can have a melt strength (measured at 190° C.) from 3.0 cN to 4.0 cN, alternatively the melt strength is from 3.5 cN to 3.8 cN, measured according to the Melt Strength Test Method, described later.

Aspect 16. The B-LLDPE copolymer of aspect 1 having a density from 0.9160 to 0.9200 g/cm³, alternatively from 0.9170 to 0.9190 g/cm³, measured according to ASTM D792-13, Method B; the $I_2$ from 0.1 g/10 min. to 0.8 g/10 min., alternatively from 0.2 g/10 min. to 0.7 g/10 min., alternatively from 0.3 g/10 min. to 0.7 g/10 min., measured according to the Melt Index Test Method at 190° C. and 2.16 kilograms according to ASTM D1238-13; the $M_z$ from 650,000 to 1,900,000 g/mol, alternatively from 650,000 to 1,500,000 g/mol, alternatively from 850,000 to 1,500,000 g/mol, measured according to the GPC Test Method; and the SHI from 6 to 32 η*(1.0)/η*(100), alternatively from 12 to 32 η*(1.0)/η*(100), alternatively from 20 to 32 η*(1.0)/η*(100), measured according to SHI Test Method. Aspect 17—the B-LLDPE copolymer of aspect 16 further described by a tan δ from 1.6 to 3.1, measured at 190° C. and a frequency of 0.1000 radians per second (rad/s) according to Tan δ Test Method. Aspect 18—the B-LLDPE copolymer of aspect 16 and/or aspect 17 further described by a low elution fraction of 3.8 percent to 4.6 percent as measured by iCCD technique from above 25° C. to below 35° C. Aspect 19—the B-LLDPE copolymer of any combination of aspect 16, aspect 17 and/or aspect 18 further described by a high density fraction of 6 percent to 10 percent as measured by iCCD technique from above 95° C. to below 115° C. Aspect 20—the B-LLDPE copolymer of any combination of aspect 16, aspect 17, aspect 18 and/or aspect 19 where the $I_2$ is from 0.3 g/10 min. to 0.4 g/10 min., measured according to the Melt Index Test Method at 190° C. and 2.16 kilograms according to ASTM D1238-13. Aspect 21—the B-LLDPE copolymer of any combination of aspect 16, aspect 17, aspect 18, aspect 19, and/or aspect 20 further described by a $I_{21}/I_2$ from 32 to 75, measured according to the Melt Index Test Method at 190° C. and 21.6 and 2.16 kilograms, respectively, according to ASTM D1238-13. Aspect 22—the B-LLDPE copolymer of any combination of aspect 16, aspect 17, aspect 18, aspect 19, aspect 20 and/or aspect 21 further described by a $M_z/M_w$ from 4 to 10, measured according to the GPC Test Method. The B-LLDPE copolymer of each of aspects 16-22 can have a $M_w/M_n$ from 5.0 to 12.0, alternatively the $M_w/M_n$ of the B-LLDPE copolymer can be from 5.5 to 6.5, all measured according to the GPC Test Method, described later. In addition, the B-LLDPE copolymer of each of aspects 16-22 can have a melt strength (measured at 190° C.) from 7.0 cN to 10.0 cN, alternatively the melt strength is from 7.0 cN to 9.0 cN, measured according to the Melt Strength Test Method, described later.

Aspect 23. The B-LLDPE copolymer of any combination of aspect 1 through aspect 22, where a comonomer used in forming the bimodal linear low density polyethylene copolymer is selected from 1-hexene, 1-butene or a combination thereof.

Aspect 24—the B-LLDPE copolymer of any combination of aspect 1 through aspect 23, where a number of short chain branches (SCB) per 1000 carbon atoms (C) measured according to the GCP Test Method is greater at $M_w$ than at Mn. Aspect 25—the B-LLDPE copolymer of any combination of aspect 1 through aspect 23, where a number of SCB per 1000 C measured according to the GCP Test Method is 14 to 110 percent greater at $M_w$ than at Mn. Aspect 26—the B-LLDPE copolymer of any combination of aspect 4 through aspect 9 further described by a SCB per 1000 C being 35 to 105 percent greater at $M_w$ than at Mn. Aspect 27—the B-LLDPE copolymer of any combination of aspect 4 through aspect 9 further described by a SCB per 1000 C being 35 to 45 percent greater at $M_w$ than at Mn. Aspect 28—the B-LLDPE copolymer of any combination of aspect 12 through aspect 15 further described by a SCB per 1000 C being 55 to 60 percent greater at $M_w$ than at Mn. Aspect 29—the B-LLDPE copolymer of any combination of aspect 16 through aspect 22 further described by a SCB per 1000 C being 20 to 55 percent greater at $M_w$ than at Mn. Aspect 30—the B-LLDPE copolymer of any combination of aspect 1 through aspect 23, where the number of SCB per 1000 C at $M_w$ measured according to the GCP Test Method is from 18 to 40. Aspect 31—the B-LLDPE copolymer of any combination of aspect 4 through aspect 9 further described by a SCB per 1000 C at $M_w$ measured according to the GCP Test Method of 19 to 30. Aspect 32—the B-LLDPE copolymer of any combination of aspect 4 through aspect 9 further described by a SCB per 1000 C at $M_w$ measured according to the GCP Test Method of 24.5 to 30 and a SCB per 1000 C at Mn measured according to the GCP Test Method of 12 to 21.5. Aspect 33—the B-LLDPE copolymer of any combination of aspect 12 through aspect 15 further described by a SCB per 1000 C at $M_w$ measured according to the GCP Test Method of 27 to 30 and a SCB per 1000 C at Mn measured according to the GCP Test Method of 17 to 19. Aspect 34—the B-LLDPE copolymer of any combination of aspect 16 through aspect 22 further described by a SCB per 1000 C at $M_w$ measured according to the GCP Test Method of 18.5 to 22 and a SCB per 1000 C at Mn measured according to the GCP Test Method of 12.5 to 15.6. Aspect 35—the B-LLDPE copolymer of any combination of aspect 16 through aspect 22 further described by a SCB per 1000 C at $M_w$ measured according to the GCP Test Method of 19 to 22 and a SCB per 1000 C at Mn measured according to the GCP Test Method of 12.5 to 15.6.

Aspect 36—the B-LLDPE copolymer of any combination of aspect 1 through aspect 23, has an $I_5$ value as measured according to ASTM D1238-13 of 1 to 18 and an $I_{21}/I_5$ value of 10 to 27. Aspect 37—the B-LLDPE copolymer of any combination of aspect 4 through aspect 9 further described by an $I_5$ value as measured according to ASTM D1238-13 of 2.5 to 5. Aspect 38—the B-LLDPE copolymer of any combination of aspect 4 through aspect 9 further described by an $I_5$ value as measured according to ASTM D1238-13 of 2.5 to 3.5. Aspect 39—the B-LLDPE copolymer of any combination of aspect 12 through aspect 15 further described by an $I_5$ value as measured according to ASTM D1238-13 of 17 to 18. Aspect 40—the B-LLDPE copolymer of any combination of aspect 16 through aspect 22 further described by an $I_5$ value as measured according to ASTM D1238-13 of 1 to 3. Aspect 41—the B-LLDPE copolymer of any combination of aspect 16 through aspect 22 further described by an $I_5$ value as measured according to ASTM D1238-13 of 1 to 2.

Aspect 42—the B-LLDPE copolymer of any combination of aspect 1 through aspect 23, has an $I_{21}/I_5$ value of 10 to 27. Aspect 43—the B-LLDPE copolymer of any combination of aspect 4 through aspect 9 further described by an $I_{21}/I_5$ value of 11 to 26. Aspect 44—the B-LLDPE copolymer of any combination of aspect 4 through aspect 9 further described by an $I_{21}/I_5$ value of 14 to 18. Aspect 45—the B-LLDPE copolymer of any combination of aspect 12 through aspect 15 further described by an $I_{21}/I_5$ value of 17 to 18. Aspect 46—the B-LLDPE copolymer of any combination of aspect 16 through aspect 22 further described by an $I_{21}/I_5$ value of 10 to 22.

Aspect 47. A manufactured article comprising a shaped form of the B-LLDPE copolymers of any one of aspect 1 through aspect 46. Aspect 48—the manufactured article of aspect 47 selected from: films, sheets, packaging film and non-packaging film and injection molded articles. The manufactured article may be a film such as a cast film or a blown film. Aspect 49—the manufactured article of aspect 47 or 48 selected from agricultural film, food packaging, garment bags, waste bags, trash bags, ice bags, grocery bags, heavy-duty sacks, construction film, geomembrane, industrial sheeting, pallet and shrink wraps, bags, buckets, freezer containers, lids, and toys.

Aspect 50. A method of making the B-LLDPE copolymers of any one of aspect 1 through aspect 46, the method comprising contacting ethylene ("$C_2$") and a comonomer ("$C_x$", as provided herein) with a bimodal catalyst system (as provided herein) in a single gas phase polymerization reactor containing a fluidized resin bed thereby making the B-LLDPE copolymer of the present disclosure.

Aspect 51. A method of making the B-LLDPE copolymers of any one of aspect 1 through aspect 46, the method comprising contacting ethylene ("$C_2$") and a comonomer ("$C_x$") selected from 1-butene ($C_x=C_4$), 1-hexene ($C_x=C_6$), or both ($C_x=C_4$ and $C_6$) at a comonomer-to-ethylene ($C_x/C_2$) molar ratio of 0.005 to 0.30, alternatively 0.008 to 0.20, alternatively 0.010 to 0.18 with a bimodal catalyst system comprising bis[(2-pentamethylphenylamido)ethyl]amine zirconium dibenzyl in the presence of molecular hydrogen gas ($H_2$) at a hydrogen-to-ethylene ($H_2/C_2$) molar ratio from 0.001 to less than 0.012, alternatively 0.001 to less than 0.01, alternatively 0.001 to 0.008, alternatively 0.002 to 0.005, alternatively 0.001 to 0.003, alternatively 0.002 to less than 0.012, alternatively 0.002 to less than 0.01, alternatively 0.002 to 0.008, alternatively 0.002 to 0.005, alternatively 0.002 to 0.003 all in a single gas phase polymerization reactor containing a fluidized resin bed at a temperature from 70 degrees Celsius (° C.) to 90° C., alternatively 70° C. to 85° C., alternatively 75° C. to 80° C., thereby making the bimodal linear low density polyethylene copolymer. Aspect 52—the method of aspect 50 and/or aspect 51 where the $H_2/C_2$ molar ratio is from 0.001 to 0.003.

Aspect 53. The method of aspect 50, aspect 51 and/or aspect 52, where the method includes a trim solution in the presence of molecular hydrogen gas ($H_2$) and an inert condensing agent (ICA) under (co)polymerizing conditions; where prior to being mixed together the trim solution consists essentially of a (tetramethylcyclopentadienyl)(n-propylcyclopentadienyl)zirconium complex (procatalyst, e.g., (tetramethylcyclopentadienyl)(n-propylcyclopentadienyl)zirconium dimethyl) and an inert liquid solvent (e.g., liquid alkane) and the bimodal catalyst system consists of an activator species (derivative, e.g., a methylaluminoxane species), the bis(2-pentamethylphenylamido)ethyl)amine zirconium dibenzyl and a (tetramethylcyclopentadienyl)(n-propylcyclopentadienyl) zirconium complex, all disposed on a solid support (e.g., a hydrophobic fumed silica); and where the (co)polymerizing conditions comprise a reaction temperature from 70 degrees Celsius ° C. to 90° C., alternatively 70° C. to 85° C., alternatively 75° C. to 80° C.; a molar ratio of the molecular hydrogen gas to the ethylene ($H_2/C_2$ molar ratio) from 0.001 to less than 0.012, alternatively 0.001 to less than 0.01, alternatively 0.001 to 0.008, alternatively 0.002 to 0.005, alternatively 0.001 to 0.003; and a molar ratio of the comonomer ($C_x$) to the ethylene ($C_x/C_2$ molar ratio) from 0.005 to 0.30, alternatively 0.008 to 0.20, alternatively 0.010 to 0.18. The B-LLDPE copolymer may be that of any one of aspects 1 to 23. In an alternative embodiment of aspect 50, aspect 51, aspect 52 and/or aspect 53, the bimodal catalyst system may be prepared, and then fed into the polymerization reactor(s) as a suspension (e.g., slurry) in a mineral oil and the trim solution may be prepared, and then fed into the polymerization reactor(s) as a solution, e.g., in a liquid alkane.

Aspect 54—the method of aspect 50, aspect 51, aspect 52 and/or aspect 53 where the bimodal catalyst system comprises a metallocene other than (tetramethylcyclopentadienyl)(n-propylcyclopentadienyl)zirconium-$X_2$ (X=chloride, methyl).

Aspect 55—the method of aspect 50, aspect 51, aspect 52, aspect 53 and/or aspect 54 where the bimodal catalyst system comprises (1,3-dimethyl-tetrahydroindenyl)(methylcyclopentadienyl)-zirconium dimethyl.

Aspect 56—the method of aspect 50, aspect 51, aspect 52, aspect 53, aspect 54 and/or aspect 55, where more than one polymerization reactor can be used with the catalysts of the present disclosure in either in a fluidized gas phase or/and in a slurry phase reactor system, as are known, where the number of reactors can be one or two as are known (e.g., two gas phase reactors, a single slurry phase reactor or two slurry phase reactors).

An activator (also known as a co-catalyst) for activating procatalysts to form catalysts can be used with the aspect of the methods provided herein. The activator can include any metal containing compound, material or combination of compounds and/or substances, whether unsupported or supported on a support material, that can activate a procatalyst to give a catalyst and an activator species. The activating may comprise, for example, abstracting at least one leaving group from a metal of a procatalyst to give the catalyst. The catalyst may be generically named by replacing the leaving group portion of the name of the procatalyst with "complex". For example, a catalyst made by activating bis(2-pentamethylphenylamido)ethyl)amine zirconium dibenzyl may be called a "bis(2-pentamethylphenylamido)ethyl) amine zirconium complex".

A catalyst made by activating (tetramethylcyclopentadienyl)(n-propylcyclopentadienyl)zirconium dichloride or (tetramethylcyclopentadienyl)(n-propylcyclopentadienyl)zirconium dimethyl may be called a "(tetramethylcyclopentadienyl)(n-propylcyclopentadienyl) zirconium complex." The catalyst made by activating (tetramethylcyclopentadienyl)(n-propylcyclopentadienyl)zirconium dichloride may be the same as or different than the catalyst made by activating (tetramethylcyclopentadienyl) (npropylcyclopentadienyl) zirconium dimethyl. The metal of the activator typically is different than the metal of the procatalyst. The molar ratio of metal content of the activator to metal content of the procatalyst(s) may be from 1000:1 to 0.5:1, alternatively 300:1 to 1:1, alternatively 150:1 to 1:1. The activator may be a Lewis acid, a non-coordinating ionic activator, or an ionizing activator, or a Lewis base, an alkylaluminum, or an alkylaluminoxane. The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, triisobutylaluminum, and the like. The alkylaluminum halide may be diethylaluminum chloride. The alkylaluminoxane may be a methyl aluminoxane (MAO), ethyl aluminoxane, or isobutylaluminoxane. The activator may be a MAO that is a modified methylaluminoxane (MMAO). The corresponding activator species may be a derivative of the Lewis acid, non-coordinating ionic activator, ionizing activator, Lewis base, alkylaluminum, or alkylaluminoxane, respectively. The activator species may have a different structure or composition than the activator from which it is derived and may be a by-product of the activation of the procatalyst or a derivative of the byproduct. An example of the derivative of the byproduct is a methylaluminoxane species that is formed by devolatilizing during spray-drying of a bimodal catalyst system made with methylaluminoxane. The activator may be commercially available. An activator may be fed into the polymerization reactor(s) (e.g., one fluidized bed gas phase reactor) in a separate feed from that feeding the reactants used to make the bimodal catalyst system (e.g., supported bimodal catalyst system) and/or the trim solution thereinto. The activator may be fed into the polymerization reactor(s) in "wet mode" in the form of a solution thereof in an inert liquid such as mineral oil or toluene, in slurry mode as a suspension, or in dry mode as a powder.

Bimodal, having two different polymer components (each made from a separate and distinct catalyst and/or process condition) and/or having two peaks that can be determined from a molecular weight distribution (MWD) such as MWD measured by gel permeation chromatography (GPC), e.g., $M_w/M_n$, measured by GPC.

Multimodal, having more than one different polymer component (each made from a separate and distinct catalyst and/or process condition) and/or having at least 2 peaks (e.g., 2 or 3 peaks) that can be determined from a MWD such as MWD measured by GPC, e.g., $M_w/M_n$, measured by GPC.

A bimodal catalyst system, as provided herein, is a combination of two or more catalyst compounds independently useful for enhancing rate of polymerization of a same olefin monomer and/or comonomer and yields a bimodal polyethylene composition. In some aspects the bimodal catalyst system has only two catalysts, and is prepared from two and only two procatalyst compounds. One of the catalyst compounds may be a metallocene catalyst compound and the other a non-metallocene catalyst compound. One of the catalyst compounds yields, under the (co)polymerizing conditions, the lower molecular weight (LMW) polyethylene component and the other catalyst compound yields the higher molecular weight (HMW) polyethylene component. The LMW and HMW polyethylene components together constitute the bimodal polyethylene composition, which may be the B-LLDPE copolymer, made with the bimodal catalyst system, and having a multimodal (e.g., bimodal) molecular weight distribution. Typically the bimodal catalyst system of the present disclosure, method employing same, and B-LLDPE copolymer of the present disclosure is free of a Ziegler-Natta catalyst.

The bimodal catalyst system may be made by contacting at least two procatalysts having different structures from each other with at least one of the activators. Each procatalyst may independently comprise a metal atom, at least one ligand bonded to the metal atom, and at least one leaving group bonded to and displaceable from the metal atom. Each metal may be an element of any one of Groups 3 to 14, e.g., a Group 4 metal. Each leaving group is H, an unsubstituted alkyl, an aryl group, an aralkyl group, a halide atom, an alkoxy group, or a primary or secondary amino group. In metallocenes, at least one ligand is a cyclopentadienyl or substituted cyclopentadienyl group. In non-metallocenes, no ligand is a cyclopentadienyl or substituted cyclopentadienyl group, and instead at least one ligand has at least one O, N, and/or P atom that coordinates to the metal atom. Typically the ligand(s) of the non-metallocene has at least two O, N, and/or P atoms that coordinates in a multidentate (e.g., bidentate or tridentate) binding mode to the metal atom. Discrete structures means the procatalysts and catalysts made therefrom have different ligands from each other, and either the same or a different metal atom, and either the same or different leaving groups.

One of the procatalysts, useful for making a catalyst of the bimodal catalyst system and/or making the trim solution, may be a metallocene compound of any one of formulas (I) to (IX) and another of the procatalysts may be a non-metallocene of any one of formulas (A) and (B), wherein the formulas are drawn in FIG. 1.

In formula (I), FIG. 1, each of the $R_1$ to $R_{10}$ groups is independently H, a ($C_1$-$C_{20}$)alkyl group, ($C_6$-$C_{20}$)aryl group or a ($C_7$-$C_{20}$)aralkyl group; M is a Group 4 metal; and each X is independently H, a halide, ($C_1$-$C_{20}$)aryl group or ($C_7$-$C_{20}$)aryl group. In some aspects each of $R_7$ to $R_{10}$ is H in formula (I).

In formula (II), FIG. 1, each of the $R_1$ to $R_6$ groups is independently H, a ($C_1$-$C_{20}$)alkyl group or ($C_7$-$C_{20}$)aralkyl group; M is a Group 4 metal (e.g., Ti, Zr, or Hf); and each X is independently H, a halide, ($C_1$-$C_{20}$)alkyl group or ($C_7$-$C_{20}$)aralkyl group. Two or more of $R_1$ to $R_5$ together can form a ring having from 4 to 10 carbon atoms, where the ring can be carbocyclic or heterocyclic.

In formula (III), FIG. 1, each of the $R_1$ to $R_{12}$ groups is independently H, a ($C_1$-$C_{20}$)alkyl group, ($C_6$-$C_{20}$)aryl group or a ($C_7$-$C_{20}$)aralkyl group, wherein at least one of $R_4$ to $R_7$ is not H; M is a Group 4 metal (e.g., Ti, Zr, or Hf); and each X is independently H, a halide, a ($C_1$-$C_{20}$)alkyl group or a ($C_7$-$C_{20}$)aralkyl group. In some aspects each of $R_9$ to $R_{12}$ is H in formula (III).

In some aspects each X in formulas (I) to (III) is independently a halide, ($C_1$-$C_4$)alkyl, or benzyl; alternatively Cl or benzyl. In some aspects each halide in formulas (I) to (III) is independently Cl, Br, or I; alternatively Cl or Br; alternatively Cl. In some aspects each M in formulas (I) to (III) is independently Ti, Zr, or Hf; alternatively Zr or Hf; alternatively Ti; alternatively Zr; alternatively Hf.

In formulas (IV) to (IX), FIG. 1, Me is a methyl group ($CH_3$), Pr is a propyl group (i.e., $CH_2CH_2CH_3$), and each "I" substituent on a ring represents a methyl group.

In formulas (A) and (B), FIG. 1, M is a Group 3 to 12 transition metal atom or a Group 13 or 14 main group metal atom, or a Group 4, 5, or 6 metal atom. M may be a Group 4 metal atom, alternatively Ti, Zr, or Hf; alternatively Zr or Hf; alternatively Zr. Each X is independently a leaving group as described above, such as an anionic leaving group. Subscript y is 0 or 1; when y is 0 group L' is absent. Subscript n represents the formal oxidation state of metal atom M and is +3, +4, or +5; alternatively n is +4. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus; alternatively nitrogen. Z is a Group 15 element, such as nitrogen or phosphorus; alternatively nitrogen. Subscript m is 0, −1, −2 or −3; alternatively −2; and represents the total formal charge of the Y, Z, and L in formula (A) and the total formal charge of the Y, Z, and L' in formula (B). $R_1$, $R_2$, $R_3$, $R_4$, $R_5$, $R_6$ and $R_7$ are independently H, a ($C_1$-$C_{20}$)hydrocarbyl group, a ($C_1$-$C_{20}$) heterohydrocarbyl group, or a ($C_2$-$C_{20}$)organoheteryl group, wherein the ($C_1$-$C_{20}$)heterohydrocarbyl group and ($C_1$-$C_{20}$) organoheteryl group each independently have at least one heteroatom selected from Si, Ge, Sn, Pb, or P. Alternatively, $R_1$ and $R_2$ are covalently bonded to each other to form a divalent group of formula —$R_{1a}$—$R_{2a}$— and/or $R_4$ and $R_5$ are covalently bonded to each other to form a divalent group of formula —$R_{4a}$—$R_{5a}$—, wherein —$R_{1a}$—$R_{2a}$— and —$R_{4a}$—$R_{5a}$— are independently a ($C_2$-$C_{20}$)hydrocarbylene group, a ($C_2$-$C_{20}$)heterohydrocarbylene group, or a ($C_2$-$C_{20}$) organoheterylene group. $R_3$ may be absent; alternatively $R_3$ is H, a halogen atom, a ($C_1$-$C_{20}$)hydrocarbyl group, a ($C_1$-$C_{20}$)heterohydrocarbyl group, or a ($C_1$-$C_{20}$)organoheteryl group. $R_3$ is absent if, for example, L is O, H, or an alkyl group. $R_4$ and $R_5$ may be a ($C_1$-$C_{20}$)alkyl group, a ($C_6$-$C_{20}$)aryl group, a substituted ($C_6$-$C_{20}$)aryl group, a ($C_3$-$C_{20}$)cycloalkyl group, a substituted ($C_3$-$C_{20}$)cycloalkyl group, a ($C_8$-$C_{20}$)bicyclic aralkyl group, or a substituted ($C_8$-$C_{20}$)bicyclic aralkyl group. $R_6$ and $R_7$ may be H or absent. R* may be absent, or may be a hydrogen, a Group 14 atom containing group, a halogen, or a heteroatom containing group.

In some aspects the bimodal catalyst system may comprise a combination of a metallocene catalyst compound and a non-metallocene catalyst compound. The metallocene catalyst compound may be a metallocene ligand-metal complex such as a metallocene ligand-Group 4 metal complex, which may be made by activating (with the activator) a procatalyst compound selected from (pentamethylcyclopentadienyl)(n-propylcyclopentadienyl)zirconium dichloride, bis(nbutylcyclopentadienyl) zirconium dichloride, (pentamethylcyclopentadienyl)(npropylcyclopentadienyl) zirconium dimethyl, and bis(n-butylcyclopentadienyl)zirconium dimethyl. The non-metallocene catalyst compound may be a non-metallocene ligand-metal complex such as a nonmetallocene ligand-Group 4 metal complex, which may be made by activating (with the activator) a procatalyst compound selected from bis(2-(2,4,6-trimethylphenylamido)ethyl) amine zirconium dibenzyl and bis(2-(pentamethylphenylamido)ethyl)amine zirconium dibenzyl.

In some aspects the bimodal catalyst system may be made by activating, according to the method of contacting with an activator, a combination of a metallocene procatalyst compound that is (tetramethylcyclopentadienyl)(n-propylcyclopentadienyl)zirconium dichloride and a non-metallocene procatalyst compound that is bis(2-pentamethylphenylamido)ethyl)amine zirconium dibenzyl. The (tetramethylcyclopentadienyl)(n-propylcyclopentadienyl)zirconium dichloride is a compound of formula (II) wherein M is Zr, each X is Cl, $R_6$ is propyl ($CH_2CH_2CH_3$), and each of $R_1$ to $R_4$ is methyl. The bis(2-pentamethylphenylamido)ethyl) amine zirconium dibenzyl is a procatalyst compound of formula (A) wherein M is Zr, each X is benzyl, $R_1$ and $R_2$ are each $CH_2CH_2$; $R_3$ is H; L, Y, and Z are all N; and $R_4$ and $R_5$ are each pentamethylphenyl; and $R_6$ and $R_7$ are absent.

Each of the catalyst compounds of the bimodal catalyst system independently may be unsupported, alternatively supported on a support material, in which latter case the bimodal catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some aspects the bimodal catalyst system is the bimodal catalyst system described in any one of the following references: U.S. Pat. Nos. 7,193,017 B2; 7,312,279 B2; 7,858,702 B2; 7,868,092 B2; 8,202,940 B2; and 8,378,029 B2 (e.g., column 4/line 60 to column 5/line 10 and column 10/lines 6 to 38 and Example 1).

The bimodal catalyst system may be fed into the polymerization reactor(s) in "dry mode" or "wet mode", alternatively dry mode, alternatively wet mode. The dry mode is fed in the form of a dry powder or granules. The wet mode is fed in the form of a suspension of the bimodal catalyst system in an inert liquid such as mineral oil. In some aspects of the present disclosure the bimodal catalyst system is commercially available under the PRODIGY™ Bimodal Catalysts trade designator, e.g., BMC-200, from Univation Technologies, LLC.

($C_3$-$C_{20}$)alpha-olefin are compounds as seen in formula (I): $H_2C=C(H)$—R, wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. The ($C_3$-$C_{20}$)alpha-olefin is used as a comonomer from which the comonomeric units of the LMW polyethylene component are derived may be the same as, alternatively different than, the ($C_3$-$C_{20}$)alpha-olefin from which the comonomeric units of the HMW polyethylene component are derived. Preferably, the alpha-olefin is 1-hexene, 1-butene or a combination thereof.

Consisting essentially of, consist(s) essentially of, and the like. Partially-closed ended expressions that exclude anything that would affect the basic and novel characteristics of that which they describe, but otherwise allow anything else. As applied to the description of a bimodal catalyst system embodiment consisting essentially of bis(2-pentamethylphenylamido)ethyl)amine zirconium dibenzyl and (tetramethylcyclopentadienyl)(n-propylcyclopentadienyl)zirconium dichloride, both disposed on a solid support and activated with an activating agent, the expression means the embodiment does not contain a Ziegler-Natta catalyst or any organic ligand other than the bis(2-pentamethylphenylamido)ethyl) amine, benzyl, tetramethylcyclopentadienyl, and n-propylcyclopentadienyl ligands. One or more of the benzyl and chloride leaving groups may be absent from the Zr in the bimodal catalyst system. The expression "consisting essentially of" as applied to the description of the "trim solution" means the trim solution is unsupported (i.e., not disposed on a particulate solid) and is free of a Ziegler-Natta catalyst or any organic ligand other than the tetramethylcyclopentadienyl and n-propylcyclopentadienyl ligands. The expression "consist essentially of" as applied to a dry inert purge gas means that the dry inert purge gas is free of, alternatively has less than 5 parts per million based on total parts by weight of gas of water or any reactive compound that could oxidize a constituent of the present polymerization reaction. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

(Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the B-LLDPE copolymer.

At least one, alternatively each of the (co)polymerizing conditions may be fixed (i.e., unchanged) during production of the B-LLDPE copolymer. Such fixed (co)polymerizing conditions may be referred to herein as steady-state (co) polymerizing conditions. Steady-state (co)polymerizing conditions are useful for continuously making embodiments of the B-LLDPE copolymer having same polymer properties.

Alternatively, at least one, alternatively two or more of the (co)polymerizing conditions may be varied within their defined operating parameters during production of the B-LLDPE copolymer in order to transition from the production of a first embodiment of the B-LLDPE copolymer having a first set of polymer properties to a second embodiment of the B-LLDPE copolymer having a second set of polymer properties, wherein the first and second sets of polymer properties are different and are each within the limitations described herein for the B-LLDPE copolymer. For example, all other (co)polymerizing conditions being equal, a higher molar ratio of ($C_3$-$C_{20}$)alpha-olefin comonomer/ethylene feeds in the inventive method of copolymerizing produces a lower density of the resulting product B-LLDPE copolymer. At a given molar ratio of comonomer/ethylene, the molar ratio of the procatalyst of the trim solution relative to total moles of catalyst compounds of the bimodal catalyst system may be varied to adjust the density, melt index, melt flow, molecular weight, and/or melt flow ratio thereof. To illustrate an approach to making transitions, perform one of the later described inventive copolymerization examples to reach steady-state (co)polymerizing conditions. Then change one of the (co)polymerizing conditions to begin producing a new embodiment of the B-LLDPE copolymer. Sample the new embodiment and measure a property thereof. If necessary, repeat the change condition/sample product/measure property steps at intervals until the measurement shows the desired value for the property is obtained. An example of such varying of an operating parameter includes varying the operating temperature within the aforementioned range from 70° C. to 90° C. such as by changing from a first operating temperature of 80° C. to a second operating temperature of 81° C., or by changing from a third operating temperature of 82° C. to a third operating temperature of 85° C. Similarly, another example of varying an operating parameter includes varying the molar ratio of molecular hydrogen to ethylene ($H_2/C_2$) from 0.0017 to 0.0018, or from 0.0020 to 0.0019. Similarly, another example of varying an operating parameter includes varying the molar ratio of comonomer ($C_x$) to the ethylene ($C_x/C_2$ molar ratio) from 0.006 to 0.010, or from 0.008 to 0.009. Combinations of two or more of the foregoing example variations are included herein. Transitioning from one set to another set of the (co)polymerizing conditions is permitted within the meaning of "(co)polymerizing conditions" as the operating parameters of both sets of (co)polymerizing conditions are within the ranges defined therefore herein. A beneficial consequence of the foregoing transitioning is that any described property value for the B-LLDPE copolymer, or the LMW or HMW polyethylene component thereof, may be achieved by a person of ordinary skill in the art in view of the teachings herein.

The (co)polymerizing conditions may further include a high pressure, liquid phase or gas phase polymerization reactor and polymerization method to yield the B-LLDPE copolymer. A gas phase polymerization processes is preferred. Such reactors and methods are generally well-known in the art. For example, the liquid phase polymerization reactor/method may be solution phase or slurry phase such as described in U.S. Pat. No. 3,324,095. The gas phase polymerization reactor/method may employ the inert condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, $CFCl_3$, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The (co)polymerizing conditions may further include using molecular hydrogen to control final properties of the LMW and/or HMW polyethylene components or B-LLDPE copolymer. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/C_2$), or hydrogen to comonomer ($H_2/\alpha$-olefin) may be from 0.0001 to less than 0.012, alternatively 0.001 to less than 0.01, alternatively 0.0005 to 0.009, alternatively 0.0009 to 0.008, alternatively 0.001 to less than 0.01, alternatively 0.001 to 0.005, alternatively 0.001 to 0.003.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Dry. Generally, a moisture content from 0 to less than 5 parts per million based on total parts by weight. Materials fed to the polymerization reactor(s) during a polymerization reaction under (co)polymerizing conditions typically are dry.

Ethylene. A compound of formula $H_2C=CH_2$. A polymerizable monomer.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Higher molecular weight (HMW). Relative to LMW, having a higher weight average molecular weight (Mw). The HMW polyethylene component of the B-LLDPE copolymer may have an $M_w$ from 10,000 to 1,000,000 g/mol. The lower endpoint of the $M_w$ for the HMW polyethylene component may be 20,000, alternatively 40,000, alternatively 60,000, alternatively 80,000, alternatively 100,000 g/mol. The upper endpoint of $M_w$ may be 1,000,000, alternatively 800,000, alternatively 700,000, alternatively 600,000, alternatively 580,000 g/mol. In describing the B-LLDPE copolymer, the bottom portion of the range of Mw for the HMW polyethylene component may overlap the upper portion of the range of $M_w$ for the LMW polyethylene component, with the proviso that in any embodiment of the B-LLDPE copolymer the particular $M_w$ for the HMW polyethylene component is greater than the particular $M_w$ for the LMW polyethylene component. The HMW polyethylene component may be made with a catalyst prepared by activating a non-metallocene ligand-Group 4 metal complex.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Inert condensing agent (ICA). An inert liquid useful for cooling materials in the polymerization reactor(s) (e.g., a fluidized bed reactor). In some aspects the ICA is a ($C_5$-$C_{20}$) alkane, alternatively a ($C_5$-$C_{15}$) alkane, alternatively a ($C_5$-$C_{10}$) alkane. In some aspects the ICA is a ($C_5$-$C_{20}$) alkane. In some aspects the ($C_5$-$C_{20}$) alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 15 mol %, alternatively from 3 to 12 mole %, alternatively from 5 to 10 mole %. Other values are also possible (e.g., up to 26 mole %, where when used in amounts from about 20 mole % to 26 mole % the process can be referred to as operating in "super condensing mode").

Lower molecular weight (LMW). Relative to HMW, having a lower weight average molecular weight (Mw). The LMW polyethylene component of the B-LLDPE copolymer may have an $M_w$ from 3,000 to 100,000 g/mol. The lower endpoint of the $M_w$ for the LMW polyethylene component may be 5,000, alternatively 8,000, alternatively 10,000, alternatively 12,000, alternatively 15,000, alternatively 20,000 g/mol. The upper endpoint of $M_w$ may be 100,000, alternatively 80,000, alternatively 60,000, alternatively 58,000 g/mol. The LMW polyethylene component may be made with catalyst prepared by activating a metallocene ligand-Group 4 metal complex.

Polyethylene. A macromolecule, or collection of macromolecules, composed of repeat units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such repeat units are derived from ethylene monomer, and, in aspects wherein there are less than 100 mol % ethylenic repeat units, the remaining repeat units are comonomeric units derived from at least one ($C_3$-$C_{20}$)alpha-olefin; or collection of such macromolecules. Linear low density polyethylene (LLDPE). The macromolecule having a substantially linear structure.

Procatalyst. Also referred to as a precatalyst or catalyst compound (as opposed to active catalyst compound), generally a material, compound, or combination of compounds that exhibits no or extremely low polymerization activity (e.g., catalyst efficiency may be from 0 or <1,000) in the absence of an activator, but upon activation with an activator yields a catalyst that shows at least 10 times greater catalyst efficiency than that, if any, of the procatalyst.

Start-up or restart of the polymerization reactor(s) illustrated with a fluidized bed reactor. The start-up of a recommissioned fluidized bed reactor (cold start) or restart of a transitioning fluidized bed reactor (warm start/transition) includes a time period that is prior to reaching the (co)polymerizing conditions. Start-up or restart may include the use of a seedbed preloaded or loaded, respectively, into the fluidized bed reactor. The seedbed may be composed of powder of polyethylene. The polyethylene of the seedbed may be a LDPE, alternatively a LLDPE, alternatively a bimodal LLDPE, alternatively a previously made embodiment of the B-LLDPE copolymer.

Start-up or restart of the fluidized bed reactor may also include gas atmosphere transitions comprising purging air or other unwanted gas(es) from the reactor with a dry (anhydrous) inert purge gas, followed by purging the dry inert purge gas from the reactor with dry ethylene gas. The dry inert purge gas may consist essentially of molecular nitrogen ($N_2$), argon, helium, or a mixture of any two or more thereof. When not in operation, prior to start-up (cold start), the fluidized bed reactor contains an atmosphere of air. The dry inert purge gas may be used to sweep the air from a recommissioned fluidized bed reactor during early stages of start-up to give a fluidized bed reactor having an atmosphere consisting of the dry inert purge gas. Prior to restart (e.g., after a change in seedbeds or prior to a change in alpha-olefin comonomer), a transitioning fluidized bed reactor may contain an atmosphere of unwanted alpha-olefin, unwanted ICA or other unwanted gas or vapor. The dry inert purge gas may be used to sweep the unwanted vapor or gas from the transitioning fluidized bed reactor during early stages of restart to give the fluidized bed reactor having an atmosphere consisting of the dry inert purge gas. Any dry inert purge gas may itself be swept from the fluidized bed reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the fluidized bed reactor to the reaction temperature of the (co)polymerizing conditions.

Start-up or restart of the fluidized bed reactor also includes introducing feeds of reactants and reagents thereinto. The reactants include the ethylene and the alpha-olefin. The reagents fed into the fluidized bed reactor include the molecular hydrogen gas and the inert condensing agent (ICA) and the mixture of the bimodal catalyst system and the trim solution.

Substance or article in need of covering. A naturally occurring or man-made material, or manufactured article that would benefit from having a layer of the B-LLDPE copolymer thereover, therearound, or thereon. Substances in need of covering include those vulnerable to their external environments and those in need of segregation therefrom. External environments may contain oxygen, moisture, and/or light, which may degrade such substances but for the layer of the B-LLDPE copolymer. Such substances include clothing, drugs, food, electronic components, hygroscopic compounds, plants, and any other light, oxygen and/or moisture-sensitive material or manufactured article. Articles in need of covering include ordered arrangements of materials (e.g., stacks of manufactured articles on a pallet in need of wrapping), boxes in need of shrink wrapping, loose manufactured articles in need of shipping, and toxic or corrosive materials.

Trim solution. Any one of the metallocene procatalyst compounds or the non-metallocene procatalyst compounds described earlier dissolved in the inert liquid solvent (e.g., liquid alkane). The trim solution is mixed with the bimodal catalyst system to make the mixture, and the mixture is used in the inventive polymerization reaction to modify at least one property of the B-LLDPE copolymer made thereby. Examples of such at least one property are density, melt index 12, melt flow ratio, and molecular mass dispersity ($M_w/M_n$), which may be referred to as molecular weight distribution. The mixture of the bimodal catalyst system and the trim solution may be fed into the polymerization reactor(s) in "wet mode", alternatively may be devolatilized and fed in "dry mode." The dry mode is fed in the form of a dry powder or granules. When mixture contains a solid support, the wet mode is fed in the form of a suspension or slurry. In some aspects the inert liquid is a liquid alkane such as isopentane, heptane or ISOPAR™ C, available from ExxonMobil Chemical.

Ziegler-Natta catalysts as used herein are heterogeneous materials that enhance olefin polymerization reaction rates and typically are products that are prepared by contacting inorganic titanium compounds, such as titanium halides supported on a magnesium chloride support, with an activator. The activator may be an alkylaluminum activator such as triethylaluminum (TEA), triisobutylaluminum (TIBA), diethylaluminum chloride (DEAC), diethylaluminum ethoxide (DEAE), or ethylaluminum dichloride (EADC).

Advantageously the B-LLDPE copolymer has physical properties that are both surprising and useful. For example, it unpredictably has at least one improved property such as at least one improved (increased) processability property and/or at least one improved (increased) stiffness property. The improved processability property may be at least one of decreased extruder barrel pressure, increased sealability (e.g., hot seal/hot tack), decreased tan delta value, and increased shear thinning index value. The improved stiffness property may be at least one of increased Elmendorf tear (CD Tear), increased melt strength, and increased secant modulus. In some aspects the B-LLDPE copolymer is not characterized by a worsening of any three, alternatively any two, alternatively any one of the foregoing properties.

Test samples of embodiments of unfilled and filled compositions may be separately made into compression molded plaques. The mechanical properties of these compositions may be characterized using test samples cut from the compression molded plaques.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pennsylvania, USA. ISO means the standards organization, International Organization for Standardization, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Melt Strength Test Method. Melt Strength (MS) measurements were conducted on a Gottfert Rheotens 71.97 (Gottfert Inc.; Rock Hill, S.C.) attached to a Gottfert Rheotester 2000 capillary rheometer. A polymer melt (about 20-30 grams, pellets) was extruded through a capillary die with a flat entrance angle (180 degrees) with a capillary diameter of 2.0 mm and an aspect ratio (capillary length/capillary diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips located 100 mm below the die, with an acceleration of 2.4 mm/second$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Dart Impact Test Method: measured according to ASTM D 1709-16a, *Standard Test Methods for Impact Resistance of Plastic Film by the Free-Falling Dart Test Method*, Method A. Method A employs a dart with a 38.10±0.13-mm (1.500±0.005-in.) diameter hemispherical head dropped from a height of 0.66±0.01 (26.0±0.4 in.). This test method can be used for films whose impact resistances require masses of about 50 g or less to about 6 kg to fracture them. Results expressed in grams (g).

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Elmendorf Tear Test Method: measured according to ASTM D 1922-09, *Standard Test Methods for Propagation Tear Resistance of Plastic Film and Thin Sheeting by Pendulum Method*, Type B (constant radius). (Technically equivalent to ISO 6383-2.) Report results as normalized tear in cross direction (CD) or machine direction (MD) in gram-force (gf).

Melt Index (190° C., 2.16 kg, "$I_2$") Test Method: use ASTM D 1238-13, *Standard Test Method for Melt Flow Rates of Thermoplastics by Extrusion Platometer*, using conditions of 190° C./2.16 kilograms (kg). Report results in units of grams eluted per 10 minutes (g/10 min.) or the equivalent in decigrams per 1.0 minute (dg/1 min.).

Flow Index (190° C., 21.6 kg, "$I_{21}$") Test Method: use ASTM D 1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.) or the equivalent in decigrams per 1.0 minute (dg/1 min.).

Flow Rate (190° C., 5.0 kg, "$I_5$") Test Method: use ASTM D 1238-13, using conditions of 190° C./5.0 kg. Report results in units of grams eluted per 10 minutes (g/10 min.) or the equivalent in decigrams per 1.0 minute (dg/1 min.).

Flow Rate Ratio Test Method (190° C., "$I_{21}/I_2$"): calculated by dividing the value from the Flow Index $I_{21}$ Test Method by the value from the Melt Index $I_2$ Test Method.

Flow Index Ratio Test Method (190° C., "$I_{21}/I_5$"): calculated by dividing the value from the Flow Index $I_{21}$ Test Method by the value from the Flow Rate $I_5$ Test Method.

Gel permeation chromatography (GPC) Test Method: number of short chain branches (SCB) per 1000 carbon atoms; Weight-Average Molecular Weight Test Method: determine z-average molecular weight (Mz), weight-average molecular weight (Mw), number average molecular weight (Mn), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). Prepare the solvent by dissolving 6 g of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. De-gas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min. and allow the DRI detector to stabilize for 8 hours before injecting the first sample. Calculate $M_w$ and Mn using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, a PS=0.67, $K_{PS}$=0.000175, and $a_x$ and $K_x$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, I indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/01731 23 page 24-25, paragraphs [0334] to [0341]. Plot of dW/dlog (MW) on the y-axis versus Log(MW) on the x-axis to give a GPC chromatogram, wherein Log(MW) and dW/dlog (MW) are as defined above.

Short Chain Branching is determined using gel permeation chromatography (GPC), where the comonomer content incorporated in the polymers (weight %) is determined by rapid FT-IR spectroscopy on the dissolved polymer in a GPC measurement. For instance, comonomer content is determined with respect to polymer molecular weight by use of an infrared detector such as an IR5 detector in a gel permeation chromatography measurement, as described in Analytical Chemistry 2014, 86(17), 8649-8656. "Toward Absolute Chemical Composition Distribution Measurement of Polyolefins by High-Temperature Liquid Chromatography Hyphenated with Infrared Absorbance and Light Scattering Detectors" by Dean Lee, Colin Li Pi Shan, David M. Meunier, John W. Lyons, Rongjuan Cong, and A. Willem deGroot. Analytical Chemistry 2014 86 (17), 8649-8656.

1% or 2% Secant Modulus Test Method: measured according to ASTM D882-12, *Standard Test Methods for Tensile Properties of Thin Plastic Sheeting*. Used either 1% or 2% secant modulus in cross direction (CD) or machine direction (MD). Report results in megapascals (MPa). 1,000.0 pounds per square inch (psi)=6.8948 MPa.

Shear Thinning Index (SHI) Test Method: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency ($\omega$). Obtain a SHI value by calculating the complex viscosities at given values of complex modulus and calculating the ratio of the two viscosities. For example, using the values of complex modulus of 1 kilopascal (kPa) and 100 kPa, obtain the $\eta^*$(1.0 kPa) and $\eta^*$(100 kPa) at a constant value of complex modulus of 1.0 kPa and 100 kPa, respectively. The SHI (1/100) is defined as the ratio of the two viscosities $\eta^*$(1.0 kPa) and n*(100 kPa), i.e., $\eta^*$(1.0)/$\eta^*$(100).

Tan Delta (Tan $\delta$) Test Method: a dynamic mechanical analysis (DMA) method measured at 190° C. and 0.1000 radians per second (rad/s) using the following procedure: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency ($\omega$). A tan delta ($\delta$) at a particular frequency ($\omega$) is defined as the ratio of loss modulus (G") to storage modulus (G') obtained at that frequency ($\omega$), i.e. tan $\delta$=G"/G'. The tan $\delta$ value at frequency ($\omega$) 0.1 radian/second is used later in Table 2.

Tensile Modulus Test Method: measured according to ASTM D882-12, *Standard Test Methods for Tensile Properties of Thin Plastic Sheeting*. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Film Puncture Test Method: ASTM D5748-95(2012), *Standard Test Method for Protrusion Puncture Resistance of Stretch Wrap Film*. Determines the resistance to puncture of a film as resistance to penetration of the film by a probe impinging the film at a standard speed such as 250 millimeters per minute (mm/min.). The probe is coated with a polytetrafluoroethylene and has an outer diameter of 1.905 cm (0.75 inch). The film is clamped during the test. The probe eventually penetrates or breaks the clamped film. The peak force at break, i.e., the maximum force, energy (work) to break or penetrate the clamped film, and the distance that the probe has penetrated at break, are recorded using mechanical testing software. The probe imparts a biaxial stress to the clamped film that is representative of the type of stress encountered by films in many product end-use applications. This resistance is a measure of the energy-absorbing ability of a film to resist puncture under these conditions. Results expressed in foot-pound force per cubic inch (ft*lbf/in$^3$).

Optical Gloss Test Method: ASTM D2457-13, *Standard Test Method for Specular Gloss of Plastic Films and Solid Plastics*. Measure specular gloss using a glassometer at incident angles 20°, 45°, 60°, or 75°. Specular gloss is unitless.

Optical Haze Test Method: ASTM D1003-13, *Standard Test Method for Haze and Luminous Transmittance of Transparent Plastics*. Measure haze using a hazemeter. Express haze as percentage of luminous transmission which in passing through the film deviates from an incident beam by forward scattering. Results expressed in percent (%).

Zero Shear Viscosity Determination Method: perform small-strain (10%) oscillatory shear measurements on polymer melts at 190° C. using an ARES-G2 Advanced Rheometric Expansion System, from TA Instruments, with parallel-plate geometry to obtain complex viscosity |η*| versus frequency (ω) data. Determine values for the three parameters—zero shear viscosity, η$_o$, characteristic viscous relaxation time, τ$_η$, and the breadth parameter, a, by curve fitting the obtained data using the following CY Model:

$$|\eta^*(\omega)| = \frac{\eta°}{[1 + (\tau_\eta \omega)^a]^{\frac{(1-n)}{a}}},$$

wherein |h*(w)| is magnitude of complex viscosity, h$_o$ is zero shear viscosity, t$_h$ is viscous relaxation time, a is the breadth parameter, n is power law index, and w is angular frequency of oscillatory shear.

Improved comonomer content distribution (iCCD) analysis was performed with Crystallization Elution Fractionation (CEF) instrumentation (PolymerChar, Spain) equipped with an IR-5 detector (PolymerChar, Spain) and two angle light scattering detectors Model 2040 (Precision Detectors, currently Agilent Technologies). A guard column packed with 20-27 micron glass (MoSCi Corporation, USA) in a 10 cm (length) by ¼" (ID) (0.635 cm ID) stainless was installed just before the IR-5 detector in the detector oven. ortho-Dichlorobenzene (ODCB, 99% anhydrous grade or technical grade) is used, and silica gel 40 (particle size 0.2~0.5 mm, catalogue number 10181-3 from EMD Chemicals) can be used to pre-dry ODCB solvent. The CEF instrument is equipped with an autosampler with N$_2$ purging capability. ODCB is sparged with dried nitrogen (N$_2$) for one hour before use. Sample preparation is done with autosampler at 4 mg/mL (unless otherwise specified) under shaking at 160° C. for 1 hour. The injection volume is 300 μL. The temperature profile of iCCD is: crystallization at 3° C./min from 105° C. to 30° C., thermal equilibrium at 30° C. for 2 minute (including Soluble Fraction Elution Time being set as 2 minutes), and elution at 3° C./min from 30° C. to 140° C. The flow rate during crystallization is 0.0 ml/min. The flow rate during elution is 0.50 ml/min. The data is collected at one data point/second.

The iCCD column is packed with gold-coated nickel particles (Bright 7GNM8-NiS, Nippon Chemical Industrial Co.) in a 15 cm (length) by ¼" (0.635 cm) (ID) stainless tubing. The column packing and conditioning are prepared using a slurry method according to the reference (Cong, R.; Parrott, A.; Hollis, C.; Cheatham, M. WO2017/040127A1). The final pressure with TCB slurry packing is 150 bar.

Column temperature calibration was performed by using a mixture of the Reference Material Linear homopolymer polyethylene (having zero comonomer content, Melt index (I$_2$) of 1.0, polydispersity M$_w$/M$_n$ approximately 2.6 by conventional gel permeation chromatography, 1.0 mg/mL) and Eicosane (2 mg/mL) in ODCB. The iCCD temperature calibration consisted of four steps: (1) Calculating the delay volume defined as the temperature offset between the measured peak elution temperature of Eicosane minus 30.00° C.; (2) Subtracting the temperature offset of the elution temperature from the iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference has a peak temperature at 101.0° C., and Eicosane has a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

For the whole resin, integration windows are set to integrate all the chromatograms in the elution temperature (temperature calibration is specified above) range from 25.0° C. to 115° C. The weight percentage of the high density fraction of the resin (HDF) is defined by the following Equation:

$$HDF = \frac{(\text{integrated area of elution window } 95-115° \text{ C.})}{(\text{integrated area of entire elution window } 25-115° \text{ C.})} \times 100\%$$

The weight percentage of the low density fraction of the resin (LDF) is defined by the following Equation:

$$LDF = \frac{(\text{integrated area of elution window } 25-35° \text{ C.})}{(\text{integrated area of entire elution window } 25-115° \text{ C.})} \times 100\%$$

EXAMPLES

Bimodal catalyst system 1 ("BMC1"): consisted essentially of or made from bis(2-pentamethylphenylamido)ethyl) amine zirconium dibenzyl and (tetramethylcyclopentadienyl)(npropylcyclopentadienyl) zirconium dichloride spray-dried in a 3:1 molar ratio onto CAB-O-SIL TS610, a hydrophobic fumed silica made by surface treating hydrophilic (untreated) fumed silica with dimethyldichlorosilane support, and methylaluminoxane (MAO), and fed into a gas phase polymerization reactor as a 20.0 weight percent slurry in mineral oil. The molar ratio of moles MAO to (moles of bis(2-pentamethylphenylamido)ethyl)amine zirconium dibenzyl + moles (tetramethylcyclopentadienyl)(npropylcyclopentadienyl) zirconium dichloride) was 120:1.

Bimodal catalyst system 2 ("BMC2"): consisted essentially of or made from bis(2-pentamethylphenylamido)ethyl) amine zirconium dibenzyl and (1,3-dimethyltetrahydroindenyl)(methylcyclopentadienyl) zirconium dimethyl spray-dried in a 3:1 molar ratio onto CAB-O-SIL TS610, a hydrophobic fumed silica made by surface treating hydrophilic (untreated) fumed silica with dimethyldichlorosilane support, and methylaluminoxane (MAO), and fed into a gas phase polymerization reactor as a 20.9 weight percent slurry in mineral oil. The molar ratio of moles MAO to (moles of bis(2-pentamethylphenylamido)ethyl)amine zirconium dibenzyl + moles (tetramethylcyclopentadienyl)(npropylcyclopentadienyl) zirconium dichloride) was 148:1.

Comonomer 1: 1-Hexene, used at a molar ratio of 1-hexene/C2 in Tables 1a/1b. Comonomer 2: 1-Butene, used at a molar ratio of 1-butene/C2 in Tables 1a/1b. Ethylene ("C2"): partial pressure of C2 was maintained as described later in Tables 1a/1b.

Inert condensing agent 1 ("ICA1"): isopentane, used at a mole percent (mol %) concentration in the gas phase of a gas phase reactor relative to the total molar content of gas phase matter. Reported later in Tables 1a/1b.

Molecular hydrogen gas ("H2"): used at a molar ratio of H2/C2 in Tables 1a/1b.

Trim solution 1 ("Trim1"): consisted essentially of or made from tetramethyl-cyclopentadienyl)(n-propylcyclopentadienyl) zirconium dimethyl (procatalyst) dissolved in isopentane to give a solution having 0.04 weight percent procatalyst.

Trim solution 2 ("Trim2"): consisted essentially of or made from (1,3-dimethyl-tetrahydroindenyl)(methylcyclopentadienyl) zirconium dimethyl (procatalyst) dissolved in isopentane to give a solution having 0.04 weight percent procatalyst.

Inventive Examples (IE) 1 to 15: synthesis of embodiments of B-LLDPE copolymers. Produced the embodiments of B-LLDPE copolymer of IE1 to IE15 in separate polymerization reaction runs in a single, continuous mode, gas phase fluidized bed reactor. The fluidized bed reactor was configured with a plurality of gas feed inlets and catalyst feed inlets and a product discharge outlet. The polymerization reaction used a Bimodal Catalyst System, a Trim solution, ethylene ("C2"), a comonomer, ICA1, H2 gas. The Trim solution was used to adjust the melt index properties of the embodiment of the B-LLDPE copolymer. In an experimental run, the reactor was preloaded before startup with seedbed comprising granular resin. First, the gaseous atmosphere in the reactor containing the preloaded seedbed was dried using high purity anhydrous molecular nitrogen gas to a moisture content below 5 ppm moisture. Then feed gases of ethylene ("C2"), comonomer, molecular hydrogen gas ("H2"), and ICA1 (isopentane) were introduced to build gas phase conditions in the reactor to desired operating gas phase conditions, while the reactor was heated up to the desired operating temperature. The build of gas phase conditions was performed and operating gas phase conditions were maintained in the reactor at a partial pressure of ethylene in the reactor of 1500 kPa (220 psia) and by metering the gas feeds to the reactor at a molar ratio of comonomer/$C_2$, a molar ratio of $H_2/C_2$, and a mole percent (mol %) isopentane as listed later in Tables 1a/1b for each example and in Table 2 for specific Comparative Examples. Then mixed a feed of the Trim solution with a feed of the Bimodal Catalyst System to give a mixture thereof, which is then fed into the reactor, wherein mixing may be done at varying molar ratios to fine tune melt index and density properties of bimodal LLDPE polymer being produced in the reactor to desired target values to give the embodiments of the B-LLDPE copolymers (product) of IE1 to IE15. The B-LLDPE copolymers were collected from the product discharge outlet and characterized. Operating constituents and parameters are summarized below in Tables 1a, 1 b. Properties of the B-LLDPE copolymers of the Examples and the co-polymers of the Comparative Examples are summarized later in Tables 2a/2b. For making another embodiment of B-LLDPE copolymer wherein density is from 0.8900 to 0.9300 g/cm$^3$, replicate the procedure except adjust the molar ratio of comonomer/$C_2$ as required to achieve the desired density.

TABLE 1a (co)polymerizing conditions for IE 1 through IE 8

|  | IE 1 | IE 2 | IE 3 | IE 4 | IE 5 | IE 6 | IE 7 | IE 8 |
|---|---|---|---|---|---|---|---|---|
| Catalyst | BMC1 | BMC1 | BMC1 | BMC1 | BMC1 | BMC1 | BMC1 | BMC2 |
| Trim Type | Trim1 | Trim1 | Trim1 | Trim1 | Trim1 | Trim1 | Trim1 | Trim2 |
| Catalyst Feed Rate, mL/hr | 2.3 | 1.8 | 1.1 | 2.0 | 1.3 | 1.8 | 1.5 | 4.5 |
| Trim Feed rate, mL/hr | 11.2 | 3.6 | 19.9 | 13.3 | 6.3 | 55.9 | 12.8 | 183 |
| Production Rate, kg/hr | 17.87 | 17.55 | 20.00 | 16.69 | 19.96 | 22.50 | 18.96 | 21.59 |
| Residence Time, hr | 2.21 | 2.20 | 1.92 | 2.30 | 2.00 | 1.82 | 2.10 | 1.90 |
| Reactor Bed Temp, ° C. | 85.00 | 80.00 | 80.00 | 85.00 | 80.00 | 80.00 | 85.00 | 78.00 |
| Bed weight, kg | 39.51 | 38.37 | 38.37 | 39.33 | 39.87 | 39.55 | 39.33 | 40.10 |
| FBD, lb/ft3 | 13.90 | 13.40 | 13.40 | 14.00 | 13.50 | 14.50 | 12.90 | 15.60 |
| Comonomer | hexene | butene | butene | hexene | hexene | hexene | hexene | hexene |
| Cx/C2 Mole Ratio | 0.047 | 0.140 | 0.139 | 0.039 | 0.046 | 0.043 | 0.040 | 0.0377 |
| Cx/C2 Flow Ratio, kg/kg | 0.106 | 0.241 | 0.222 | 0.084 | 0.100 | 0.083 | 0.079 | 0.086 |
| H2/C2 Mole Ratio | 0.010 | 0.010 | 0.001 | 0.010 | 0.003 | 0.001 | 0.003 | 0.0110 |
| H2/C2 Flow Ratio, g/kg | 0.707 | 0.722 | 0.062 | 0.719 | 0.187 | 0.063 | 0.195 | 0.713 |
| APS, cm | 0.272 | 0.130 | 0.147 | 0.203 | 0.206 | 0.201 | 0.152 | 0.133 |
| Fines, wt % | 0.0 | 0.3 | 0.4 | 0.1 | 0.1 | 0.1 | 0.2 | 0.40 |

TABLE 1b (co)polymerizing conditions for IE 9 through IE 15

| | IE 9 | IE 10 | IE 11 | IE 12 | IE 13 | IE 14 | IE 15 |
|---|---|---|---|---|---|---|---|
| Catalyst | BMC1 | BMC1 | BMC1 | BMC1 | BMC2 | BMC1 | BMC1 |
| Trim Type | Trim1 | Trim1 | Trim1 | Trim1 | Trim2 | Trim1 | Trim1 |
| Catalyst Feed Rate, mL/hr | 1.5 | 1.6 | 2.7 | 2.0 | 4.5 | 1.2 | 1.7 |
| Trim Feed rate, mL/hr | 9.7 | 0 | 27.2 | 38.4 | 10.5 | 1.6 | 0 |
| Production Rate, kg/hr | 19.64 | 17.06 | 17.96 | 18.64 | 19.10 | 19.50 | 18.28 |
| Residence Time, hr | 2.01 | 2.30 | 2.20 | 2.11 | 2.10 | 2.00 | 2.15 |
| Reactor Bed Temp, ° C. | 80.00 | 80.00 | 80.00 | 80.00 | 78.00 | 70.00 | 80.00 |
| Bed weight, kg | 39.51 | 38.15 | 39.51 | 39.19 | 39.55 | 38.87 | 39.28 |
| FBD, lb/ft3 | 15.10 | 12.00 | 14.70 | 14.60 | 14.60 | 13.60 | 13.77 |
| Comonomer | hexene | hexene | hexene | hexene | Hexene | hexene | hexene |
| Cx/C2 Mole Ratio | 0.0460 | 0.0385 | 0.040 | 0.042 | 0.0310 | 0.0486 | 0.0435 |
| Cx/C2 Flow Ratio, kg/kg | 0.101 | 0.087 | 0.080 | 0.082 | 0.071 | 0.129 | 0.103 |
| H2/C2 Mole Ratio | 0.0030 | 0.0055 | 0.001 | 0.001 | 0.0110 | 0.0030 | 0.0094 |
| H2/C2 Flow Ratio, g/kg | 0.343 | 0.473 | 0.061 | 0.064 | 0.715 | 0.322 | 0.656 |
| APS, cm | 0.180 | 0.198 | 0.180 | 0.183 | 0.170 | 0.234 | 0.201 |
| Fines, wt % | 0.18 | 0.06 | 0.1 | 0.1 | 0.09 | 0.03 | 0.04 |

Comparative Examples CE A through CE E, CE H through CE Q are commercially available: CE A—EXCEED™ 1018 HA (ExxonMobil); CE B—ELITE™ 5400 G (DOW, Inc.); CE C—Alkamax® ML1810 PN (QENOS); CE D—Alkamax® ML2610 PN (QENOS); CE E—INNATE™ ST50 (DOW, Inc.); CE H—EXCEED™ 3518 (ExxonMobil); CE I—Alkamax® ML1735 SCX (QENOS); CE J—ELITE™ 5230G (DOW, Inc.); CE K—DOWLEX™ GM 8480G (DOW, Inc.); CE L—EXCEED™ XP 8656 (ExxonMobil); CE M—DOWLEX™ 2020G; CE N—AFFINITY™ PL 1880G; CE P—INNATE™ TH60 (DOW, Inc.); CE Q—ELITE™ AT 6101 (DOW, Inc.).

Comparative Examples CE F, CE G, CE R and CE S are made according to the following examples from the cited documents. CE F—2016-VHH Part 6 found in WO 2018/089193 A1; CE G—2016-VHH Part 7 found in WO 2018/089193 A1; CE R—Comparative PE 2 found in WO 2019/070329 and CE S—Comparative PE 1 found in WO 2019/070329.

EXCEED™ 1018 HA (ExxonMobil) is an ethylene/1-hexene LLDPE made with metallocene catalyst XCAT™ HP. Alkamax® ML1810 PN (QENOS) is an ethylene/1-hexene LLDPE made with metallocene catalyst XCAT™ VP from Univation Technologies, LLC.

TABLE 2a

Copolymer Properties for Inventive Examples and Comparative Examples

| Sample | Density (ASTM D792-13, Method B) | Melt Index ($I_2$, ASTM D1238-13) | $I_{21}$ (ASTM D1238-13) | $I_5$ (ASTM D1238-13) | $I_{21}/I_5$ | $I_{21}/I_2$ | Co-monomer | H2/C2 | Process | No. of Reactors |
|---|---|---|---|---|---|---|---|---|---|---|
| IE 1 | 0.9168 | 0.97 | 58.2 | 3.24 | 18.0 | 60.0 | hexene | 0.01 | gas | 1 |
| IE 2 | 0.9178 | 1.05 | 55.4 | 3.40 | 16.3 | 52.7 | butene | 0.01 | gas | 1 |
| IE3 | 0.9169 | 1.00 | 47.4 | 4.10 | 11.6 | 47.4 | butene | 0.001 | gas | 1 |
| IE 4 | 0.9242 | 1.10 | 85.5 | 3.85 | 22.2 | 77.7 | hexene | 0.01 | gas | 1 |
| IE 5 | 0.9185 | 1.00 | 119.3 | 4.95 | 24.1 | 119.3 | hexene | 0.003 | gas | 1 |
| IE 6 | 0.9182 | 0.94 | 47.1 | 3.84 | 12.3 | 50.1 | hexene | 0.001 | gas | 1 |
| IE 7 | 0.9252 | 0.91 | 126.2 | 4.85 | 26.0 | 138.8 | hexene | 0.003 | gas | 1 |
| IE 8 | 0.9176 | 0.85 | 37.6 | 2.69 | 14.0 | 44.2 | hexene | 0.011 | gas | 1 |
| CE A | 0.918 | 1.02 | 16.0 | — | — | 15.6 | — | — | gas | 1 |
| CE B | 0.916 | 1.00 | — | — | — | — | — | — | soln | 2 |
| CE C | 0.918 | 0.98 | 30.7 | — | — | 31.5 | — | — | gas | 1 |
| CE D | 0.926 | 1.06 | 19.6 | — | — | 18.5 | — | — | gas | 1 |
| CE E | 0.918 | 0.85 | — | — | — | — | — | — | soln | 2 |
| CE F | 0.9183 | 1.17 | 37.9 | 3.48 | 10.9 | 32.4 | hexene | 0.017 | gas | 1 |
| CE G | 0.9266 | 1.02 | 33.3 | 3.04 | 10.9 | 32.6 | hexene | 0.018 | gas | 1 |
| IE 9 | 0.9177 | 3.43 | 332.5 | 17.64 | 18.8 | 96.9 | hexene | 0.003 | gas | 1 |
| CE H | 0.918 | 3.53 | 56.0 | — | — | 15.9 | — | — | gas | 1 |
| CE I | 0.917 | 3.22 | 66.4 | — | — | 20.6 | — | — | gas | 1 |
| CE J | 0.916 | 4.00 | — | — | — | — | — | — | soln | 2 |
| CE K | 0.917 | 3.00 | — | — | — | — | — | — | soln | 1 |
| IE 10 | 0.9183 | 0.34 | 25.5 | 1.19 | 21.4 | 74.9 | hexene | 0.0055 | gas | 1 |
| IE 11 | 0.9182 | 0.34 | 25.1 | 1.55 | 16.2 | 73.9 | hexene | 0.001 | gas | 1 |
| IE 12 | 0.9184 | 0.63 | 38.3 | 2.76 | 13.9 | 60.5 | hexene | 0,001 | gas | 1 |
| IE 13 | 0.9175 | 0.37 | 12.0 | 1.10 | 10.9 | 32.4 | hexene | 0.0110 | gas | 1 |
| CE L | 0.916 | 0.49 | 13.6 | 1.38 | 9.9 | 28.0 | hexene | — | gas | 1 |
| CE M | 0.918 | 0.50 | — | — | — | — | — | — | soln | 1 |
| IE 14 | 0.9032 | 1.10 | 101.5 | 4.75 | 21.4 | 92.2 | hexene | 0.0030 | gas | 1 |
| IE 15 | 0.9124 | 0.87 | 49.3 | 2.87 | 17.2 | 56.7 | hexene | 0.0094 | gas | 1 |

TABLE 2a-continued

Copolymer Properties for Inventive Examples and Comparative Examples

| Sample | Density (ASTM D792-13, Method B) | Melt Index ($I_2$, ASTM D1238-13) | $I_{21}$ (ASTM D1238-13) | $I_5$ (ASTM D1238-13) | $I_{21}/I_5$ | $I_{21}/I_2$ | Co-monomer | H2/C2 | Process | No. of Reactors |
|---|---|---|---|---|---|---|---|---|---|---|
| CE N | 0.902 | 1 | — | — | — | — | — | — | soln | 1 |
| CE O | 0.912 | 0.85 | — | — | — | — | — | — | soln | 2 |
| CE P | 0.905 | 0.8 | — | — | — | — | — | — | soln | 2 |
| CE Q | 0.9296 | 0.99 | 87.6 | — | — | 88.5 | hexene | 0.00124 | gas | 1 |
| CE R | 0.9273 | 0.61 | 46.94 | — | — | 77.0 | hexene | 0.00124 | gas | 1 |

TABLE 2b

Copolymer Properties for Inventive Examples and Comparative Examples

| Sample | Mn | Mw | Mz | Mw/Mn | Mz/Mw | SCB per 1000 C at Mn | SCB per 1000 C at Mw |
|---|---|---|---|---|---|---|---|
| IE 1 | 9,165 | 125,208 | 695,344 | 13.66 | 5.55 | 17.28 | 24.61 |
| IE 2 | 7,519 | 119,216 | 697,422 | 15.86 | 5.85 | 21.42 | 29.60 |
| IE3 | 29,479 | 153,792 | 1,500,371 | 5.22 | 9.76 | 19.73 | 23.68 |
| IE 4 | 7,352 | 118,313 | 760,459 | 16.09 | 6.43 | 14.12 | 20.47 |
| IE 5 | 15,444 | 136,184 | 1,368,958 | 8.82 | 10.05 | 16.66 | 26.76 |
| IE 6 | 26,872 | 156,873 | 1,615,450 | 5.84 | 10.30 | 13.85 | 19.13 |
| IE 7 | 14,343 | 141,325 | 1,493,394 | 9.85 | 10.57 | 12.75 | 19.40 |
| IE 8 | 10,598 | 126,490 | 637,760 | 11.93 | 5.04 | 12.82 | 26.00 |
| CE A | 42,598 | 112,934 | 218,088 | 2.65 | 1.93 | 12.70 | 13.10 |
| CE B | 27,478 | 106,905 | 345,513 | 3.89 | 3.23 | 13.20 | 17.73 |
| CE C | 30,894 | 114,423 | 304,424 | 3.70 | 2.66 | 9.85 | 17.04 |
| CE D | 39,341 | 115,144 | 271,212 | 2.93 | 2.36 | 6.14 | 7.90 |
| CE E | 28,169 | 112,563 | 298,979 | 4.00 | 2.66 | 11.14 | 18.78 |
| CE F | 7,121 | 113,371 | 420,057 | 15.92 | 3.71 | 9.68 | 12.44 |
| CE G | 5,953 | 119,929 | 479,156 | 20.15 | 4.00 | 7.23 | 8.32 |
| IE 9 | 14,739 | 102,594 | 909,585 | 6.96 | 8.87 | 17.78 | 28.17 |
| CE H | 29,269 | 79,142 | 147,071 | 2.70 | 1.86 | 14.61 | 15.18 |
| CE I | 26,300 | 82,363 | 186,220 | 3.13 | 2.26 | 12.41 | 16.24 |
| CE J | 23,382 | 74,231 | 176,932 | 3.17 | 2.38 | 17.00 | 16.50 |
| CE K | 24,023 | 84,637 | 259,384 | 3.52 | 3.06 | 18.27 | 15.35 |
| IE 10 | 13,831 | 164,788 | 879,591 | 11.91 | 5.34 | 14.87 | 21.40 |
| IE 11 | 29,002 | 187,732 | 1,876,141 | 6.47 | 9.99 | 12.97 | 19.52 |
| IE 12 | 28,843 | 162,200 | 1,449,907 | 5.62 | 8.94 | 13.40 | 18.79 |
| IE 13 | 17,134 | 158,423 | 655,534 | 9.25 | 4.14 | 15.65 | 19.27 |
| CE L | 35,285 | 138,399 | 365,701 | 3.92 | 2.64 | 11.24 | 21.32 |
| CE M | 32,607 | 145,182 | 559,955 | 4.45 | 3.86 | 15.38 | 12.67 |
| IE 14 | 17,999 | 130,596 | 1,032,375 | 7.26 | 7.91 | 23.34 | 37.15 |
| IE 15 | 10,367 | 131,719 | 636,382 | 12.71 | 4.83 | 17.8 | 25.70 |
| CE N | 37,621 | 88,555 | 168,403 | 2.35 | 1.90 | 24.52 | 23.80 |
| CE O | 27,153 | 109,554 | 276,655 | 4.03 | 2.53 | 14.7 | 23.13 |
| CE P | 36,110 | 105,350 | 242,403 | 2.92 | 2.30 | 22.54 | 20.00 |

TABLE 2c

Copolymer Properties for Inventive Examples and Comparative Examples

| Sample | SHI (1/100) | tan δ @ 0.1 rad/sec | Melt Strength (cN @ 50 mm/sec) | % LEF (iCCD 25-35) | % HDF (iCCD 95-115) |
|---|---|---|---|---|---|
| IE 1 | 6.75 | 5.88 | 2.85 | 7.63 | 2.72 |
| IE 2 | 5.63 | 5.63 | 2.8 | 9.31 | 0.98 |
| IE3 | 19 | 2.03 | 4.33 | 1.74 | 1.24 |
| IE 4 | 7.79 | 5.67 | 2.03 | 5.33 | 3.39 |
| IE 5 | 75 | 2.94 | 2.52 | 4.33 | 2.60 |
| IE 6 | 18.92 | 2.07 | 4.85 | 2.35 | 2.75 |
| IE 7 | 37 | 2.85 | 2.48 | 2.07 | 4.04 |
| IE 8 | 5.35 | 5.96 | 3.22 | 9.74 | 3.75 |
| CE A | 1.61 | 25.65 | 2.11 | 0.29 | 5.17 |
| CE B | 5.23 | 4.9 | 3.2 | 1.18 | 9.29 |
| CE C | 2.84 | 24.52 | 1.73 | 0.31 | 5.89 |
| CE D | 2.06 | 26.95 | 1.29 | 0.15 | 20.52 |
| CE E | 4.54 | — | — | 0.65 | 17.18 |
| CE F | 3.86 | 9.43 | 1.95 | — | — |
| CE G | 3.89 | 9.37 | 2.05 | — | — |
| IE 9 | 11.5 | 3.62 | 1.39 | 5.04 | 2.11 |

TABLE 2c-continued

Copolymer Properties for Inventive Examples and Comparative Examples

| Sample | SHI (1/100) | tan δ @ 0.1 rad/sec | Melt Strength (cN @ 50 mm/sec) | % LEF (iCCD 25-35) | % HDF (iCCD 95-115) |
|---|---|---|---|---|---|
| CE H | 1.58 | 151.18 | 0.47 | 0.84 | 2.91 |
| CE I | 2.15 | 82.88 | 0.61 | 0.63 | 4.17 |
| CE J | 2.64 | 34.39 | — | 1.97 | 4.58 |
| CE K | 2.85 | 16.72 | — | 3.85 | 7.73 |
| IE 10 | 11.67 | 2.95 | 7.17 | 3.99 | 6.06 |
| IE 11 | 31.5 | 1.67 | 9.83 | — | — |
| IE 12 | 21.43 | 1.86 | 7.02 | 4.51 | 9.36 |
| IE 13 | 6 | 3.01 | 8.92 | — | — |
| CE L | 3.19 | 13.47 | 4.88 | 0.88 | 4.42 |
| CE M | — | 6.11 | — | 2.24 | 12.36 |
| IE 14 | 18.67 | 3.8 | N/A | 14.89 | 2.02 |
| IE 15 | 7.06 | 5.34 | N/A | 8.69 | 3.67 |
| CE N | — | — | N/A | 0.81 | 0.20 |
| CE O | — | — | — | 1.23 | 6.82 |
| CE P | 4 | 5.97 | N/A | 0.89 | 0.25 |

The B-LLDPE copolymers of the inventive examples demonstrate the potential for improved processability as evidenced by the shear thinning index values seen above along with the tan δ values and broader $M_z/M_w$ and MWD, e.g., $M_w/M_n$, measured by GPC, value ranges seen above. By way of further example, FIG. 2 and FIG. 3 provide plots of the molecular weight distribution and the short chain branching distribution of the polymer of samples IE 1 and IE 5, respectively. As illustrated, the short chain branching per 1000 C at $M_w$ is seen to be larger than the SCB per 1000 C at Mn for both IE 1 and IE 5.

Blown Films

Preparation of a 25 micron thick, monolayer film of the B-LLDPE copolymers and Comparative Example copolymers as set out in Tables 3a through 3d, below. Additional comparative examples seen below include: CE T—TUFLIN™ HS-7028 NT 7 (DOW, Inc.), CE U—TUFLIN™ HS-7066 NT 7 (DOW, Inc.); CE V—DOWLEX™ 2020G; CE W—VPR-0516MA (Univation).

TUFLIN™ HS-7028 NT 7 is an ethylene/1-hexene LLDPE made with Ziegler-Natta catalyst UCAT™ J. TUFLIN™ HS-7066 NT 7 (DOW, Inc.) is an is an ethylene/1-hexene LLDPE made with Ziegler-Natta catalyst UCAT™ J. DOWLEX™ 2020G is an is an ethylene/HAO LLDPE made with Ziegler-Natta catalyst. VPR 0516 MA (Univation) is an gas phase metallocene LLDPE from Univation.

For the data seen in Tables 3a-3d, a blown-film-line machine configured for making polyethylene films with a feed hopper in fluid communication with an extruder in heating communication with a heating device heated to a temperature of 221° C. The extruder is in fluid communication with a die having a fixed die gap of 1.778 millimeter (70.00 mils), a blow up ratio of 2.5:1. The Frost Line Height (FLH) is 81±5.1 centimeters (32±2 inches) from the die. The machine used a feed rate of 89.6 kg (197.6 pounds) per hour at a melt temperature of 202° C.±1° C. and an extruder rate of 28.5 revolutions per minute (rpm). Properties of the film of the Inventive Examples (B-LLDPE copolymer) and Comparative Examples are below in Tables 3a through 3d.

TABLE 3a

Properties of 25 Micron Monolayer Film

| Polymer | CE F | CE T | IE 1 | IE 2 | IE 3 | IE 5 | IE 6 | IE 8 | CE A | CE C | CE B |
|---|---|---|---|---|---|---|---|---|---|---|---|
| Avg Dart (g) | 904 | 142 | 1000 | 121 | 72 | 146 | 229 | 965 | 1100 | 1072 | 1072 |
| Average Gloss 45 deg | 25 | 46 | 28 | 39 | 33 | 15 | 33 | 30 | 30 | 21 | 57 |
| Average Haze (%) | 34 | 17 | 27 | 20 | 23 | 48 | 23 | 25 | 26 | 31 | 10 |
| Avg-Puncture (ft*lbf/in^3) | 128 | 160 | 217 | 190 | 135 | 149 | 217 | 229 | 314 | 258 | 272 |
| Avg-Secant Modulus At CD 2% (psi) | 36910 | 34665 | 32325 | 32286 | 29210 | 29336 | 30264 | 41686 | 27659 | 33423 | 28653 |
| Avg-Secant Modulus At MD 2% (psi) | 32263 | 31433 | 28676 | 28763 | 25013 | 25173 | 27068 | 33520 | 26576 | 30920 | 25583 |
| Average Tear CD (gf) | 605 | 579 | 712 | 553 | 466 | 699 | 585 | 653 | 351 | 414 | 535 |
| Average Tear MD (gf) | 316 | 370 | 259 | 137 | 29 | 258 | 217 | 243 | 270 | 246 | 256 |
| Blown Film Line Head Pressure (psi) | 3000 | 3471 | 3308 | 3308 | 3501 | 2576 | 3594 | 3844 | 5145 | 4434 | 3898 |

TABLE 3b

Properties of 25 Micron Monolayer Film

| Polymer | CE U | CE D | CE G | IE 4 | IE 7 |
|---|---|---|---|---|---|
| Avg Dart (g) | 127 | 155 | 183 | 227 | 118 |
| Average Gloss 45 deg | 41 | 24 | 14 | 25 | 10 |
| Average Haze (%) | 20 | 33 | 46 | 30 | 62 |
| Avg-Puncture (ft*lbf/in^3) | 165 | 161 | 109 | 112 | 107 |
| Avg-Secant Modulus At CD 2% (psi) | 47686 | 49700 | 50500 | 53820 | 46907 |
| Avg-Secant Modulus At MD 2% (psi) | 42796 | 45347 | 46887 | 44577 | 39943 |
| Average Tear CD (gf) | 654 | 368 | 656 | 655 | 786 |
| Average Tear MD (gf) | 240 | 201 | 260 | 142 | 65 |
| Blown Film Line Head Pressure (psi) | 4080 | 5680 | 3161 | 3048 | 2444 |

TABLE 3c

Properties of 25 Micron Monolayer Film

| Polymer | IE 10 | IE 11 | IE 12 | IE 13 | CE V | CE W |
|---|---|---|---|---|---|---|
| Avg Dart (g) | 1096 | 907 | 264 | 1276 | 808 | 1276 |
| Average Gloss 45 deg | 18 | 15 | 24 | 41 | 62 | 41 |
| Average Haze (%) | 39 | 48 | 31 | 15 | 12 | 20 |
| Avg-Puncture (ft*lbf/in^3) | 152 | 173 | 151 | 175 | 234 | 211 |
| Avg-Secant Modulus At CD 2% (psi) | 41166 | 39552 | 37336 | 41862 | 30056 | 30334 |
| Avg-Secant Modulus At MD 2% (psi) | 34447 | 34738 | 31601 | 35805 | 27807 | 26993 |
| Average Tear CD (gf) | 1021 | 680 | 617 | 799 | 620 | 371 |
| Average Tear MD (gf) | 232 | 121 | 182 | 269 | 461 | 243 |
| Blown Film Line Head Pressure (psi) | 3898 | 3939 | 3288 | 5051 | 4600 | 4730 |

TABLE 3d

Properties of 25 Micron Monolayer Film

| Polymer Blend | IE 10 + AGILITY ™ 1200 (80/20 % wt/% wt) IE 16 | IE 11 + AGILITY ™ 1200 (80/20 % wt/% wt) IE 17 | IE 12+ AGILITY ™ 1200 (80/20 % wt/% wt) IE 18 | IE 13 + AGILITY ™ 1200 (80/20 % wt/% wt) IE 19 | CE V + AGILITY ™ 1200 (80/20 % wt/% wt) CE X | CE W + AGILITY ™ 1200 (80/20 % wt/% wt) CE Y |
|---|---|---|---|---|---|---|
| Avg Dart (g) | 193 | 154 | 127 | 193 | 355 | 637 |
| Average Gloss 45 deg | 45 | 32 | 37 | 42 | 52 | 51 |
| Average Haze (%) | 15 | 21 | 19 | 15 | 11 | 12 |
| Avg-Puncture (ft*lbf/in^3) | 159 | 163 | 153 | 165 | 191 | 225 |
| Avg-Secant Modulus At CD 2% (psi) | 511168 | 439158 | 43451 | 47785 | 37248 | 42347 |
| Avg-Secant Modulus At MD 2% (psi) | 41202 | 35275 | 34617 | 41022 | 31053 | 33434 |
| Average Tear CD (gf) | 911 | 616 | 560 | 741 | 739 | 539 |
| Average Tear MD (gf) | 48 | 43 | 48 | 72 | 95 | 63 |
| Blown Film Line Head Pressure (psi) | 3940 | 4005 | 3376 | 5053 | 4738 | 4775 |

The B-LLDPE copolymer of the present disclosure can be made into a film having at least one improved property such as, for example, at least one improved (increased) processability property and/or at least one improved (increased) stiffness property. The improved processability property may be at least one of decreased extruder barrel pressure, decreased tan delta value, and increased shear thinning index value. The improved stiffness property may be at least one of increased Elmendorf tear (CD Tear), increased melt strength, increased dart impact strength and increased secant modulus. In some aspects, the B-LLDPE copolymer of the present disclosure is not characterized by a worsening of any three, alternatively any two, alternatively any one of the foregoing properties.

Cast Films

Preparation of a 20 micron thick cast film of the B-LLDPE copolymers and Comparative Example copolymers as set out in Table 4, below. For the data seen in Table 4, a cast-film-line machine configured for making polyethylene films with a feed hopper in fluid communication with an extruder in heating communication with a heating device heated to a temperature of 293° C. The extruder is in fluid communication with a die having a fixed die gap of 0.508 millimeter (20.00 mils) and an air gap of 8.9 cm. The machine used a line speed of 122 meters/min. with a feed rate of 89.6 kg (197.6 pounds) per hour at a melt temperature of 202° C.±1° C. and an extruder rate of 28.5 revolutions per minute (rpm). The chill roll temperature was 70° C. Properties of the film of the Inventive Examples (B-LLDPE copolymer) and Comparative Examples are below in Table 4.

TABLE 4

Properties of 20 Micron Cast Films

| Polymer | IE 9 | CE H | CE I | CE J | CE K |
|---|---|---|---|---|---|
| Avg Dart (g) | 81 | 677 | 563 | 539 | 248 |
| Average Gloss-45 deg | 77 | 84 | 90 | 101 | 97 |
| Average Haze (%) | 5 | 3 | 3 | 1 | 0.7 |
| Avg-Puncture (ft*lbf/in^3) | 156 | 236 | 198 | 237 | 246 |
| Avg-Secant Modulus At CD2% (psi) | 20065 | 17602 | 20468 | 17274 | 18980 |
| Avg-Secant Modulus At MD2% (psi) | 19483 | 17436 | 20856 | 17471 | 18562 |
| Average Tear-CD (gf) | 422 | 369 | 390 | 489 | 415 |
| Average Tear-MD (gf) | 292 | 297 | 329 | 335 | 284 |
| Motor Load (Amp) | 5 | 10 | 9 | 8 | 9 |

As seen above in Table 4, the B-LLDPE copolymer of the present disclosure can be made into a cast film using a motor load that is significantly less than those of the comparative example cast films.

What is claimed is:

1. A bimodal linear low density polyethylene copolymer comprising:
a density from 0.915 to 0.920 gram per cubic centimeter (g/cm$^3$) measured according to ASTM D792-13, Method B;
a melt index ($I_2$) from 3.2 grams per 10 minutes (g/10 min.) to 3.6 g/10 min., measured according to the Melt Index Test Method at 190° C. and 2.16 kilograms according to ASTM D1238-13;
a melt flow ratio ($I_{21}/I_2$) from 60 to 140, measured according to the Melt Index Test Method at 190° C. and 21.6 and 2.16 kilograms, respectively, according to ASTM D1238-13;
a $M_z$ from 800,000 to 1,200,000 grams per mole (g/mol), measured according to a Gel Permeation Chromatography (GPC) Test Method; and
a shear thinning index (SHI) from 10 to 12 $\eta^*(1.0)/\eta^*(100)$ measured according to SHI Test Method.

2. The bimodal linear low density polyethylene copolymer of claim 1 having a first molecular weight ratio ($M_z/M_w$) from 4 to 11, measured according to the GPC Test Method, wherein $M_z$ is z-average molecular weight and $M_w$ is weight-average molecular weight.

3. The bimodal linear low density polyethylene copolymer of claim 1,
wherein the density is from 0.916 to 0.926 g/cm$^3$ measured according to ASTM D792-13, Method B.

4. The bimodal linear low density polyethylene copolymer of claim 1 having a tan delta (tan δ) from 2 to 6, measured at 190° C. and a frequency of 0.1000 radians per second (rad/s) according to Tan Delta Test Method.

5. The bimodal linear low density polyethylene copolymer of claim 4, wherein the tan δ is from 5.6 to 6, measured at 190° C. and a frequency of 0.1000 radians per second (rad/s) according to Tan Delta Test Method;
the density is from 0.916 to 0.918 g/cm$^3$ measured according to ASTM D792-13, Method; and
the $M_z/M_w$ is 5 to 5.6, measured according to the GPC Test Method.

6. The bimodal linear low density polyethylene copolymer of claim 1 having a low elution fraction of 1.7 percent to 10 percent as measured by iCCD technique from above 25° C. to below 35° C.

7. The bimodal linear low density polyethylene copolymer of claim 1 having a high density fraction of 0.9 percent to 4.1 percent as measured by iCCD technique from above 95° C. to below 115° C.

8. The bimodal linear low density polyethylene copolymer of claim 1 having a tan delta (tan δ) from 3 to 4, measured at 190° C. and a frequency of 0.1000 radians per second (rad/s) according to Tan Delta Test Method.

9. The bimodal linear low density polyethylene copolymer of claim 1, having a tan delta (tan δ) from 1.6 to 3.1, measured at 190° C. and a frequency of 0.1000 radians per second (rad/s) according to Tan Delta Test Method.

10. The bimodal linear low density polyethylene copolymer of claim 1 having a low elution fraction of 3.8 percent to 4.6 percent as measured by iCCD technique from above 25° C. to below 35° C.

11. The bimodal linear low density polyethylene copolymer of claim 1 having a high density fraction of 6 percent to 10 percent as measured by iCCD technique from above 95° C. to below 115° C.

12. A manufactured article comprising a shaped form of the bimodal linear low density polyethylene copolymer of claim 1.

13. A method of making the bimodal linear low density polyethylene copolymer of claim 1, the method comprising contacting ethylene ("$C_2$") and a comonomer ("$C_x$") selected from 1-butene ($C_x=C_4$), 1-hexene ($C_x=C_6$), or both ($C_x=C_4$ and $C_6$) at a comonomer-to-ethylene ($C_x/C_2$) molar ratio of 0.005 to 0.30 with a bimodal catalyst system comprising bis[(2-pentamethylphenylamido)ethyl]amine zirconium dibenzyl in the presence of molecular hydrogen gas ($H_2$) at a hydrogen-to-ethylene ($H_2/C_2$) molar ratio from 0.001 to less than 0.012, all in a single gas phase polymerization reactor containing a fluidized resin bed at a temperature from 70° C. to 90° C., thereby making the bimodal linear low density polyethylene copolymer.

14. The method of claim 13, wherein the $H_2/C_2$ molar ratio is from 0.001 to 0.003.

15. The method of claim 13, wherein the bimodal catalyst system comprises a metallocene other than (tetramethylcyclopentadienyl) (n-propylcyclopentadienyl) zirconium-$X_2$ (X=chloride, methyl).

* * * * *